(12) United States Patent
Masuzaki et al.

(10) Patent No.: US 9,238,290 B2  
(45) Date of Patent: Jan. 19, 2016

(54) GRINDSTONE, GRINDSTONE MANUFACTURING METHOD, BORING TOOL, ABRASIVE GRAIN POSITIONING JIG, AND RELIEF SURFACE FORMING METHOD

(75) Inventors: Masahiko Masuzaki, Tochigi (JP); Koji Saito, Tochigi (JP); Masato Ide, Tochigi (JP); Satoshi Kanbayashi, Tochigi (JP); Fumio Sato, Tochigi (JP); Toshiya Hirata, Tochigi (JP); Takashi Yoshida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 13/698,787

(22) PCT Filed: May 19, 2011

(86) PCT No.: PCT/JP2011/061578  
§ 371 (c)(1),  
(2), (4) Date: Nov. 19, 2012

(87) PCT Pub. No.: WO2011/145698  
PCT Pub. Date: Nov. 24, 2011

(65) Prior Publication Data  
US 2013/0065496 A1    Mar. 14, 2013

(30) Foreign Application Priority Data

| May 21, 2010 | (JP) | 2010-117330 |
| May 21, 2010 | (JP) | 2010-117363 |
| Jun. 16, 2010 | (JP) | 2010-137447 |
| Jun. 24, 2010 | (JP) | 2010-144046 |

(51) Int. Cl.  
*B24B 7/07* (2006.01)  
*B24D 3/06* (2006.01)  
*B23Q 3/00* (2006.01)

(52) U.S. Cl.  
CPC ... *B24B 7/07* (2013.01); *B23Q 3/00* (2013.01); *B24D 3/06* (2013.01)

(58) Field of Classification Search  
CPC .............. B24D 3/06; B24D 3/00; B24D 5/06; B24B 53/00  
USPC ........ 451/541, 56, 443, 444, 72, 542; 51/293, 51/307, 308  
See application file for complete search history.

(56) References Cited

FOREIGN PATENT DOCUMENTS

| JP | 50-112886 | 9/1975 |
| JP | 60-000181 | 1/1985 |
| JP | 63-004254 U | 1/1988 |
| JP | 63-027252 U | 2/1988 |
| JP | 1-155161 | 10/1989 |

(Continued)

OTHER PUBLICATIONS

Japanese Office Action mailed Jan. 7, 2014, JP 2010-117330, 4 pages.

(Continued)

*Primary Examiner* — Robert Rose  
(74) *Attorney, Agent, or Firm* — Rankin, Hill & Clark LLP

(57) ABSTRACT

A grindstone is provided with a base (211) and a plurality of abrasive grains (210) aligned in a row and bonded on a surface (212) of the base (211). Each of the abrasive grains (210) has a relief surface (216) with a relief angle of a predetermined angle (β).

15 Claims, 27 Drawing Sheets

(56) References Cited

FOREIGN PATENT DOCUMENTS

| | | |
|---|---|---|
| JP | 3-066561 | 3/1991 |
| JP | 3-208560 | 9/1991 |
| JP | 4-372358 | 12/1992 |
| JP | 5-057617 | 3/1993 |
| JP | 6-155283 | 6/1994 |
| JP | 6-262523 | 9/1994 |
| JP | H07-9206 | 1/1995 |
| JP | 7-136936 | 5/1995 |
| JP | 11-138446 | 5/1999 |
| JP | 11-216675 | 8/1999 |
| JP | 2001-071267 | 3/2001 |
| JP | 2001-347453 | 12/2001 |
| JP | 2003-311602 | 11/2003 |
| JP | 2004-358640 | 12/2004 |
| JP | 2005-279821 | 10/2005 |
| JP | 2007-268666 | 10/2007 |
| JP | 2007-283487 | 11/2007 |
| JP | 2008-114334 | 5/2008 |
| JP | 2010-274352 | 12/2010 |

OTHER PUBLICATIONS

Japanese Office Action mailed Jan. 7, 2014, JP 2010-117363, 4 pages.
Japanese Office Action mailed Jan. 7, 2014, JP 2010-137447, 5 pages.
Chinese Office Action dated Oct. 13, 2015, 6 pages.

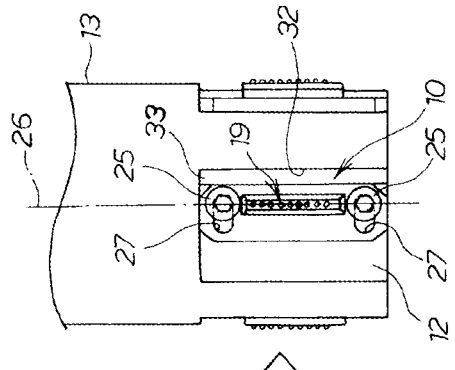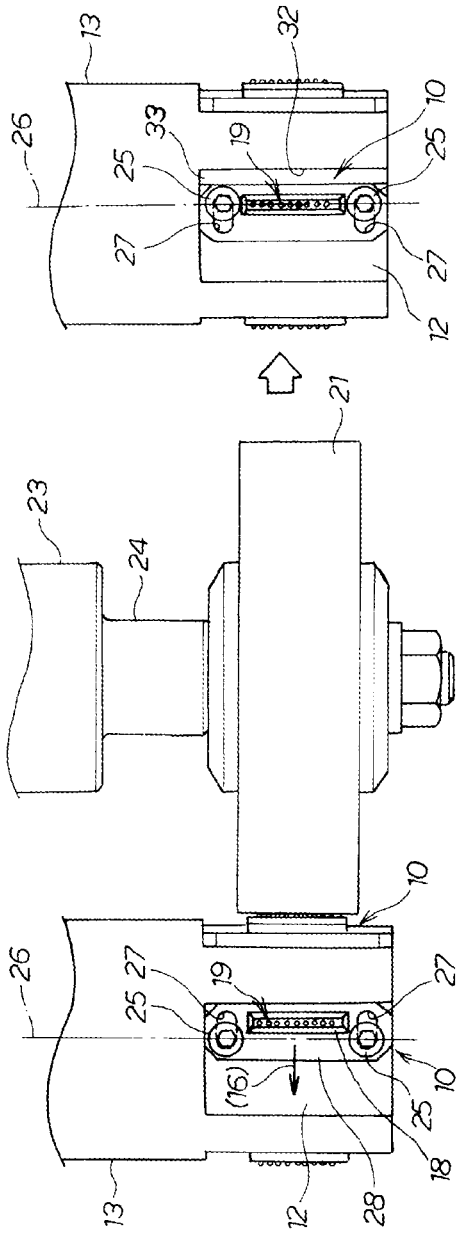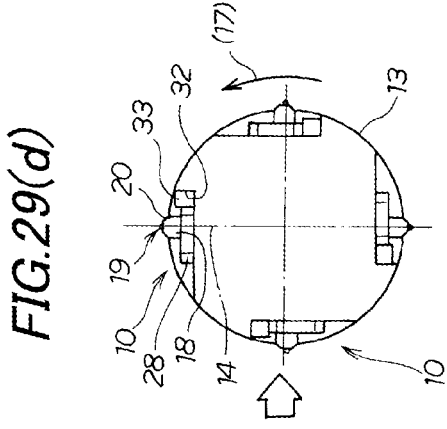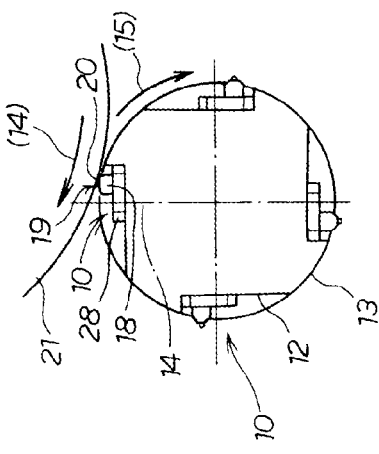

GRINDSTONE, GRINDSTONE MANUFACTURING METHOD, BORING TOOL, ABRASIVE GRAIN POSITIONING JIG, AND RELIEF SURFACE FORMING METHOD

TECHNICAL FIELD

The invention relates to a grindstone with abrasive grains arranged on one surface of a base.

BACKGROUND ART

Various grindstones have been proposed as a tool for grinding a workpiece. As one of these grindstones, a grindstone with abrasive grains arranged on one surface of a base is known (e.g., see Patent Document 1).

Patent Document 1 will be described on the basis of FIGS. 32(a) to 32(c).

As illustrated in FIG. 32(a), an upper surface 1102 of a base 1101 is covered by masks 1103 which are spaced apart from each other at a predetermined distance w. Then, as illustrated in FIG. 32(b), abrasive grains 1104 are disposed between the mask 1103 and the mask 1103, and are temporarily bonded to the base 1101 by a plating layer 1105. After temporary adhesion, the masks 1103 are removed, and then, as illustrated in FIG. 32(c), the base is again subjected to a plating process to mainly bond the abrasive grains 1104 to the base 1104, so that a grindstone 1110 is completed.

An outer diameter of the abrasive grain 1104 used for the grindstone 1110 is larger than the distance w of the masks 1103, as illustrated in FIG. 32(b). Since the outer diameter of the abrasive grains 1104 is larger than the predetermined distance w, the abrasive grains 1104 are temporarily bonded in a state in which vertexes 1111 protrude upward. The temporarily bonded abrasive grains 1104 are mainly bonded in the state in which the vertexes 1111 protrude upward, as illustrated in FIG. 32(c).

As the vertexes 1111 protrude upward, the workpiece to be ground by the grindstone 1110 comes in contact with the vertexes 1111. Two faces, between which the vertex 1111 is interposed, serve as a rake surface 1112 and a relief surface 1113 in an edged tool. As the two faces, between which the vertex 1111 is interposed, serve as the rake surface 1112 and the relief surface 1113, the workpiece can be effectively ground.

In order to manufacture the grindstone 1110, it is necessary to temporarily bond the abrasive grains in the state in which the masks 1103 are provided, and then, after the masks 1103 are removed, again mainly bond the abrasive grains. That is, since it is necessary to divide and provide the plating layers 1105 in two steps, the number of steps is increased.

In addition, Patent Document 2 discloses a grindstone in which a plurality of abrasive grains are bonded to a surface of a base in a state of the grains are arranged in pieces. In order to set a height from the surface of the base to a vertex of the abrasive grain, a top of the abrasive grains is removed through truing.

FIG. 33(a) is a view illustrating one example of the abrasive grains. An abrasive grain 2101 is formed in a polygonal shape. The abrasive grain 2101 is displaced on a surface of a base 2102, and then is bonded thereto by a plating 2103, as illustrated in FIG. 33(b), thereby manufacturing a grindstone 2103.

As illustrated in FIG. 33(c), as the grindstone 2104 is moved in a direction indicated by an arrow (1), a surface of a workpiece 2015 can be ground.

In FIG. 33(b), a direction of the abrasive grain 2101 is not controlled. That is, an upper surface 2106 may be parallel with the surface of the base 2102, or may be inclined to the surface.

If the upper surface 2106 is parallel with the surface of the base 2102, the upper surface 2106 comes in contact with the surface 2107 of the workpiece 2105, and thus grinding resistance is increased.

As a result, machining precision or a lifetime of the grindstone is deteriorated.

Meanwhile, in a grindstone 3100 includes a base 3101 and abrasive grains 3103 and 3104 which are bonded to an upper surface of the base 3101 by a plating layer 3102, as illustrated in FIG. 34, as vertex portions 3105 and 3106 of the abrasive grains of the grindstone 3100 are ground at a predetermined angle, relief surfaces 3108 and 3109 can be formed. Since the abrasive grains have the relief surfaces 3108 and 3109, the grindstone 3100 can effectively grind the workpiece.

It is believed that the abrasive grains 3103 and 3104 bonded to the upper surface of the grindstone 3100 are dispersed in a longitudinal direction (front and rear direction of the drawing) of the grindstone 3100, in addition to a width direction (left and right direction of the drawing).

If the abrasive grains are dispersed in the longitudinal direction (front and rear direction of the drawing), as illustrated in FIG. 35, an abrasive grain 3111 indicated by an imaginary line exists in front of the abrasive grain 3104. As described above, the abrasive grains 3104 and 3111 are formed with relief surfaces 3109 and 3112 on the same surface by the grinding.

Focusing on rake surfaces, a rake surface 3114 of the abrasive grain 3104 and a rake surface 3115 of the abrasive grain 3111 are not aligned with each other. That is, since the size, shape or position of the abrasive grains 3104 and 3111 is different from each other, the rake surfaces 3114 and 3115 are not aligned with each other.

A position of an edge portion positioned between the rake surface and the relief surface is not aligned.

It is also considered a method of machining the relief surface, as illustrated in FIG. 36. The grindstone 4110 is secured to a cylindrical rotating tool 4112, with grindstone pockets 4111 for receiving the grindstone 4110 being provided on its circumference. The grindstone 4110 includes a base 4113 and an abrasive grain 4114 bonded to the base 4113, and the abrasive grain is placed on a center line 4115 of the rotating tool 4112. The plurality of abrasive grains 4114 are aligned and disposed on the plurality of bases 4113 provided on the circumference of the rotating tool 4112.

A truing grindstone 4116 is displaced at a position in which the truing grindstone 4116 comes in contact with the abrasive grain 4114.

The relief surface is formed on the abrasive grain 4114 by approaching and bringing the truing grindstone 4116 into contact with the rotating tool 4112, which is positioned and fixed, at a slope of a predetermined angle θ of a radial line 4118 of the truing grindstone 4116 to the center line 4115 of the rotating tool 4112, while the truing grindstone 4116 is rotated as indicated by an arrow (3). After that, the rotating tool 4112 is rotated at a predetermined angle (90° in FIG. 37) and then is again positioned and fixed, and the relief surface is sequentially formed on the abrasive grains 4114 arranged and displaced on all bases 4113 on the circumference of the rotating tool 4112.

According to the method, however, in order to uniformly form the relief surface on the abrasive grains 4114 arranged and displaced on all bases 4113 on the circumference of the rotating tool 4112 at high precision, it is necessary to constantly maintain a center distance between the truing grindstone 4116 and the rotating tool 4112 when the truing grindstone 4116 comes in contact with the abrasive grains at the predetermined angle θ. Since the truing stone 4116 or the rotating tool 4112 is significantly large relative to the abrasive grain 4114, even a slight slippage in the predetermined angle θ or the center distance is not allowed. As a result, it is not possible to actually form the uniform relief surface of the high precision.

PRIOR ART DOCUMENTS

Patent Documents

Patent Document 1: JP-A-2004-358640
Patent Document 2: JP-A-2001-347453

SUMMARY OF INVENTION

An embodiment of the present invention provides a technology of manufacturing a grindstone in a small number of steps.

Also, an embodiment of the present invention provides a grindstone capable of further improving precision of a finished surface by further reducing a grinding resistance.

In addition, an embodiment of the present invention provides a grindstone manufacturing technology capable of aligning rake surfaces of abrasive grains.

Furthermore, an embodiment of the present invention provides a technology capable of forming relief surfaces on a plurality of abrasive grains by an easy method.

In accordance with embodiments of the present invention, in grindstones 130, 214, 350 and 10 including bases 113, 211, 319 and 18 and a plurality of abrasive grains 111, 210, 322 and 19 which are arranged in a row and bonded to a surface of the base 113, 211, 319 and 18, the plurality of abrasive grains 111, 210, 350 and 10 may respectively have relief surfaces 119, 216, 346, 356, 357 and 20 with a predetermined relief angle.

In addition, in accordance with embodiments of the present invention, a grindstone 130 may be manufactured by the steps of: preparing the base 113, the abrasive grain 111, a temporary stand 112 to which the abrasive grain 111 is temporarily bonded, and an adhesive 114 temporarily bonding the abrasive grain 111 to the temporary stand 112; applying the adhesive 114 to an upper surface 116 of the temporary stand 112; temporarily bonding the abrasive grain 111 to the upper surface 116 of the temporary stand 112 by the adhesive 114; inverting the temporary stand 112 to direct the abrasive grain 111 downward; facing the temporary stand 112 to the base 113 while the temporary stand 112 is maintained at a predetermined angle θ1; bonding the abrasive grain 111 to the base 113 by a plating layer 125; and detaching the temporary stand 112 from the abrasive grain 111.

Moreover, in accordance with embodiments of the present invention, a grindstone 350 may be manufactured by the steps of: preparing the base 319 and the plurality of abrasive grains 322; arranging the abrasive grains 322 on the one surface 337 of the base 319 so that rake surfaces 342 of the plurality of abrasive grains 322 follow the longitudinal direction; bonding the abrasive grains 322 to the base 319 by a plating layer 345 in a state in which the rake surfaces 342 are arranged on the same surface; and forming relief surfaces 346 on the abrasive grains 322.

Furthermore, in accordance with embodiments of the present invention, a abrasive grain positioning jig may include: a support member 321 which supports the base 319 which is inclined to a horizontal direction; and a contact portion 323 which extends from the support member 321 to the one surface 337 of the base 319, and comes in contact with a predetermined surface of the abrasive grain 332 which is arranged on the one surface 337 of the base 319.

In addition, in accordance with embodiments of the invention, a grindstone 10 which is attached to a grindstone pocket 12 formed in a cylindrical rotating tool 13 may include: an abrasive grain bonding portion 18 which extends along an axis 26 of the rotating tool 13 and to which abrasive grains 19 are bonded; the abrasive grains 19 aligned in a row in parallel with the axis 26 and bonded to the abrasive grain bonding portion 18; and a fixing hole 27 through which a fixing member 25 adapted to fix the abrasive grain bonding portion 18 to the rotating tool 13 passes. The fixing hole 27 may be configured so that the abrasive grains 19 are changed from a position on a normal line 14 of the rotating tool to a position which is offset from the normal line 14.

Other aspects and advantages of the invention will be apparent from the following description and the appended claims.

BRIEF DESCRIPTION OF DRAWINGS

FIGS. 29(a) to 29(d) are diagrams illustrating a grindstone according to an eighth exemplary embodiment.

DESCRIPTION OF EMBODIMENTS

Exemplary embodiments of the present invention will now be described with reference to the accompanying drawings.

First Exemplary Embodiment

Figure 1A:
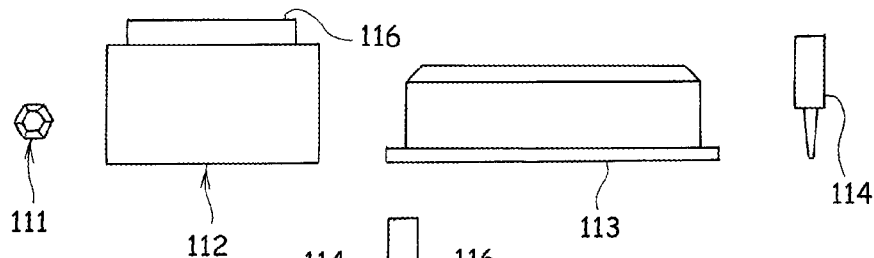
FIGS. 1(*a*) to 1(*e*) are diagrams illustrating a preparation process to an inversion process in a first exemplary embodiment.

As illustrated in FIG. 1(a), abrasive grains 111, a temporary stand 112 to which the abrasive grains 111 are temporarily bonded, a base 113 to which the abrasive gains 111 are bonded, and an adhesive 114 for temporarily bonding the abrasive grains 111 to the temporary stand 112 are prepared.

As the abrasive grains 111, abrasive grains of a truncated octahedron shape generally used can be utilized.

Figure 1B:
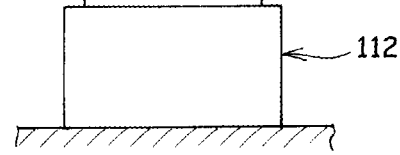
Figure 1C:
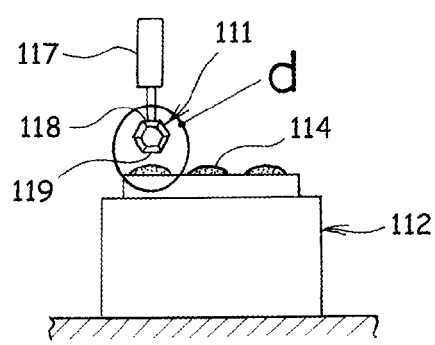

Next, as illustrated in FIG. 1(b), the adhesive 114 is applied on an upper surface 116 of the temporary stand 112. If the adhesive 114 is applied, as illustrated in FIG. 1(c), the abrasive grains 111 are moved over the adhesive 114 by a pair of air tweezers 117, and then the abrasive grains 111 are temporarily bonded. In this instance, a surface of the abrasive grain 111 sucked by the air tweezers 117 is referred to as a first surface 118, and a surface opposite to the first surface 118 is referred to as a second surface 119.

Figure 1D:
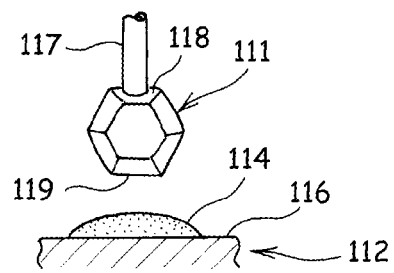

As illustrated in FIG. 1(d) which is an enlarged diagram of a section indicated by the reference numeral d in FIG. 1(c), in the case of temporary bonding, the abrasive grains 111 are pressed against the temporary stand 112 so that the second surface 119 comes in close contact with the upper surface 116 of the temporary stand 112.

In the case where the abrasive grains 111 are temporarily bonded to the adhesive 114, any means other than the air tweezers 117 (FIG. 1(c)) may be utilized. That is, if a second surface 119 of the abrasive grain 111 is precisely brought in close contact with the upper surface 116, any means can be used. The reason why the second surface 119 is brought in close contact with the upper surface 116 will be described later.

Figure 1E:
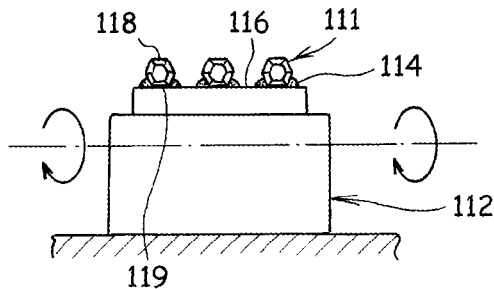

After temporary bonding, as illustrated in FIG. 1(e), the temporary stand 112 is inverted so that the abrasive grain 111 faces downward.

The first surface 118 of the abrasive grain 111 temporarily bonded is bonded to the base 113 (FIG. 1(a)), with a plating layer being interposed between the first surface and the base. It will be described in detail with reference to next drawings.

Figure 2A:
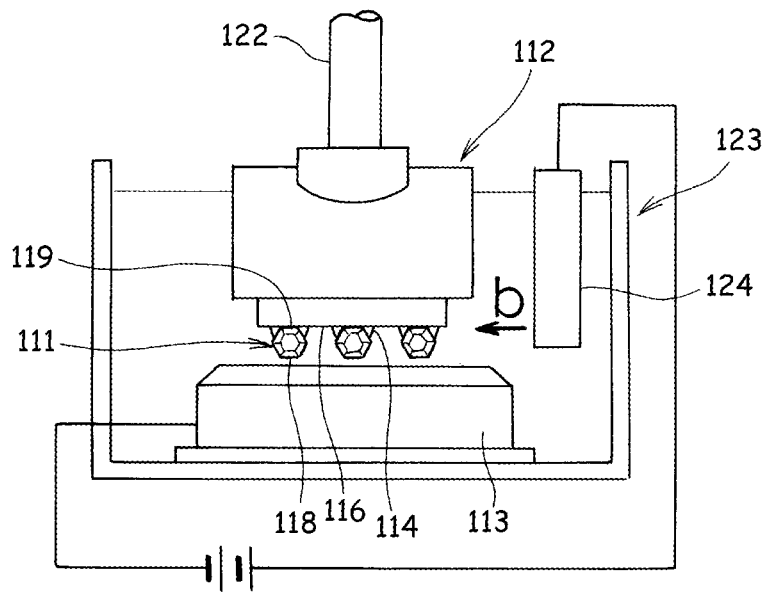
FIGS. 2(*a*) to 2(*d*) are diagrams illustrating an abrasive grain bonding process to completion.

As illustrated in FIG. 2(a), the inverted temporary stand 112 is supported by a robot arm 122, and is opposite to the base 113 provided in a plating device 123. In the state in which the stand and the base are opposite to each other, an anode is connected to a nickel plate 124, while a cathode is connected to the base 113, before a plating process is carried out. The plating process is not limited to nickel plating, but any process can be utilized.

Figure 2B:
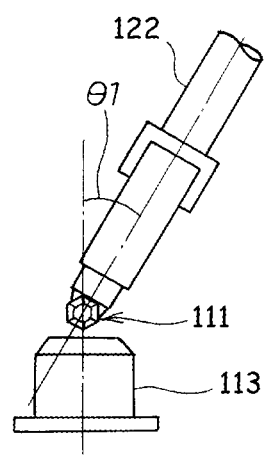

As illustrated in FIG. 2(b) when seen from a direction of the arrow b in FIG. 2(a), in the case where the base 113 is seen from one end in a longitudinal direction thereof, the robot arm 122 supports the abrasive grain 111 at a slope of a predetermined angle $\theta_1$ to the base 113. The plating process is carried out in the state in which the abrasive grain 111 is inclined.

Figure 2C:
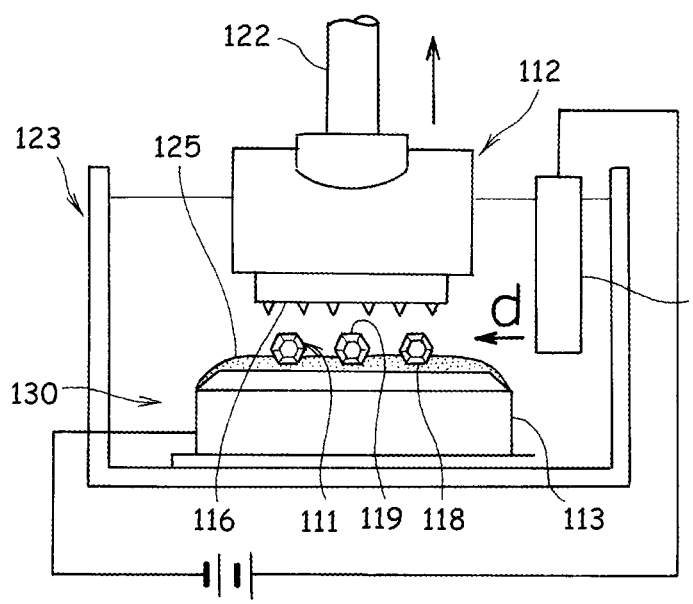

As the plating process is carried out, as illustrated in FIG. 2(c), the abrasive grains 111 are bonded to the base 113 by the plating layer 125. After the abrasive grains 111 are bonded to the base 113, as the robot arm 122 is lifted, the abrasive grains 111 are detached from the base temporarily bonded. In this instance, it is necessary to adjust a thickness of the plating layer 125 or an amount of the adhesive 114 so that the abrasive grains 111 are left on the base 113. In this embodiment, for example, the thickness of the plating layer 125 is within a range of 55% to 60% of an average grain size of the abrasive grain 111.

The grindstone 130 is completed in which the abrasive grains 111 are arranged on one surface of the base 113.

Figure 2D:
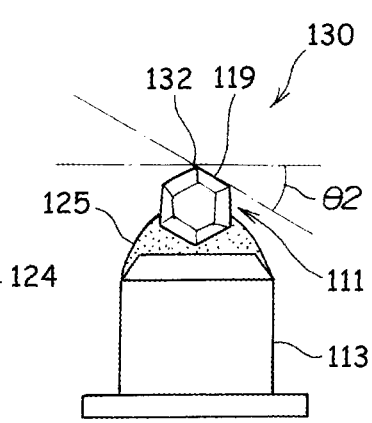

As illustrated in FIG. 2(d) when seen from a direction of the arrow d in FIG. 2(c), the abrasive grain 111 is bonded to the base 113 in the state in which the second surface 119 is inclined by $\theta_2$ to a horizontal direction. In this instance, in order to reliably incline the second surface 119 at a desired angle, the second surface 119 is necessarily brought in close contact with a temporary bonding surface 16 (FIG. 2(a)). As the second surface 119 is brought close contact with the temporary bonding surface, the second surfaces 119 of the plurality of abrasive grains 111 provided in the front and rear directions of the drawing can be harmonized with each other when seen from the longitudinal direction of the base 113.

According to the first exemplary embodiment, the grindstone may be manufactured by a method in which the temporary stand 112 is opposite to the base 113 while the temporary stand is maintained at a predetermined angle $\theta_1$, and the abrasive grains 111 are bonded to the base 113 by the plating layer 125. As the temporary stand 112 is maintained at a predetermined angle $\theta_1$, a vertex 132 of the abrasive grain 111 can be arranged to direct to the direction protruding from the base 113. Since the temporary stand 112 is opposite to the base 113, the abrasive grains 111 can be bonded to the plating layer 125, with the vertex 132 of the abrasive grain 111 being arranged to direct to the direction protruding from the base 113. That is, since the process of bonding the abrasive grains 111 is completed in one step, the number of steps can be reduced.

Also, the height of the abrasive grain 111 can be managed at the side of the vertex 132 of the abrasive grain 111. Even in the case where the size of the abrasive grains 111 is uneven to a certain degree, the protruding height of the abrasive grains 111 can be almost equal by managing it at the side of the vertex 132.

Figure 3A:
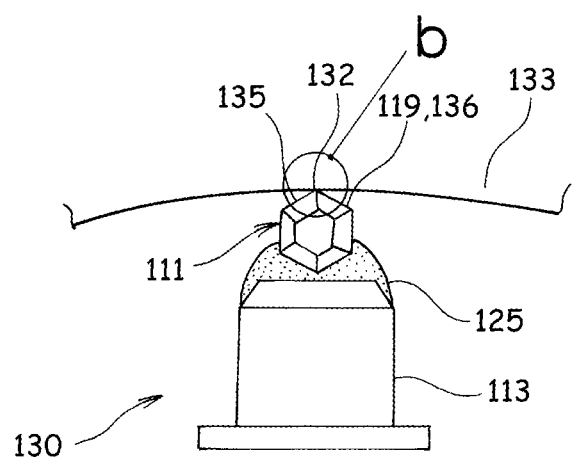
FIGS. 3(*a*) and 3(*b*) are diagrams illustrating an operation of a grindstone according to the first exemplary embodiment.

As illustrated in FIG. 3(a), in a grinding process of a workpiece 133, the grindstone 130 is brought in contact with the workpiece 133 so that the vertex 132 of the abrasive grain 111 comes in contact with the workpiece 133.

Figure 3B:
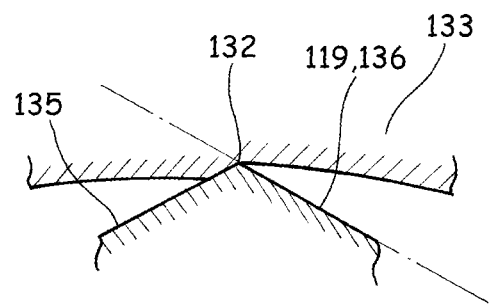

As illustrated in FIG. 3(b) which is an enlarged view of a section indicated by the reference numeral b in the FIG. 3(a), two surfaces, between which the vertex 132 is interposed, function as a rake surface 135 and a relief surface 136 which are mentioned in an edged tool. As the two surfaces, between which the vertex 132 is interposed, function as the rake surface 135 and the relief surface 136, the workpiece 133 can be effectively ground.

In the grindstone 130, the second surface 119 is designated by the relief surface 136, but the second surface 119 may be designated by the rake surface.

Second Exemplary Embodiment

A second exemplary embodiment of the present invention will be described with reference to the accompanying drawings.

Figure 4A:
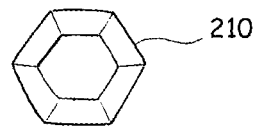
FIGS. 4(*a*) to 4(*d*) are diagrams illustrating a method of manufacturing a grindstone according to a second exemplary embodiment.

As illustrated in FIG. 4(a), an abrasive grain 210 has a polygonal shape before a relief surface is formed.

The abrasive grain 210 according to the second exemplary embodiment is described by taking a truncated octahedron for example, but any polygonal shape except for the truncated octahedron will be fine.

Figure 4B:
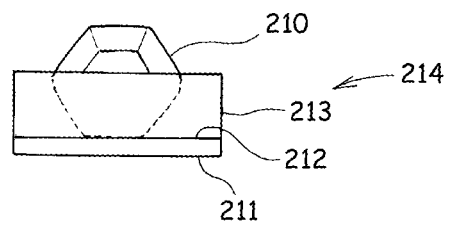

As illustrated in FIG. 4(b), a grindstone 214 with no relief surface is made by laying the abrasive grain 210 on a surface 2112 of a base 211 and bonding the abrasive grain to the surface through electrodeposition or an adhesive 213.

Figure 4C:
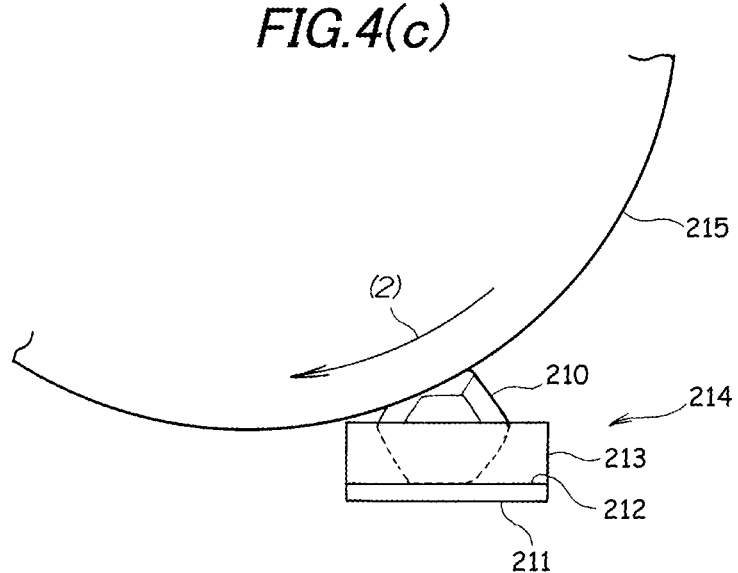

As illustrated in FIG. 4(c), truing of the abrasive grain 210 is performed by a cylindrical truing grindstone 215. The truing grindstone 215 is brought in contact with the abrasive grain 210 from a top of the drawing, and the truing grindstone 215 is rotated in a direction of the arrow (2), thereby grinding the abrasive grain 210. Since a diameter of the truing grindstone 215 is large relative to the size of the abrasive grain 210, a grinding surface of the abrasive grain 210 becomes almost flat.

Figure 4D:
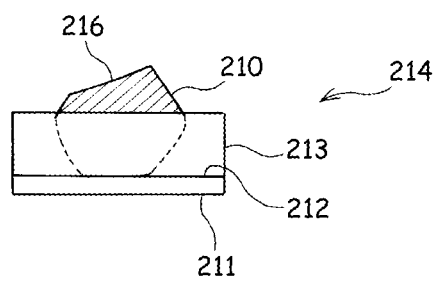

In this way, as illustrated in FIG. 4(d), a relief surface 216 is formed on the abrasive grain 210 toward the top of the drawing.

Next, a using example of the grindstone 210 will be described.

Figure 5:
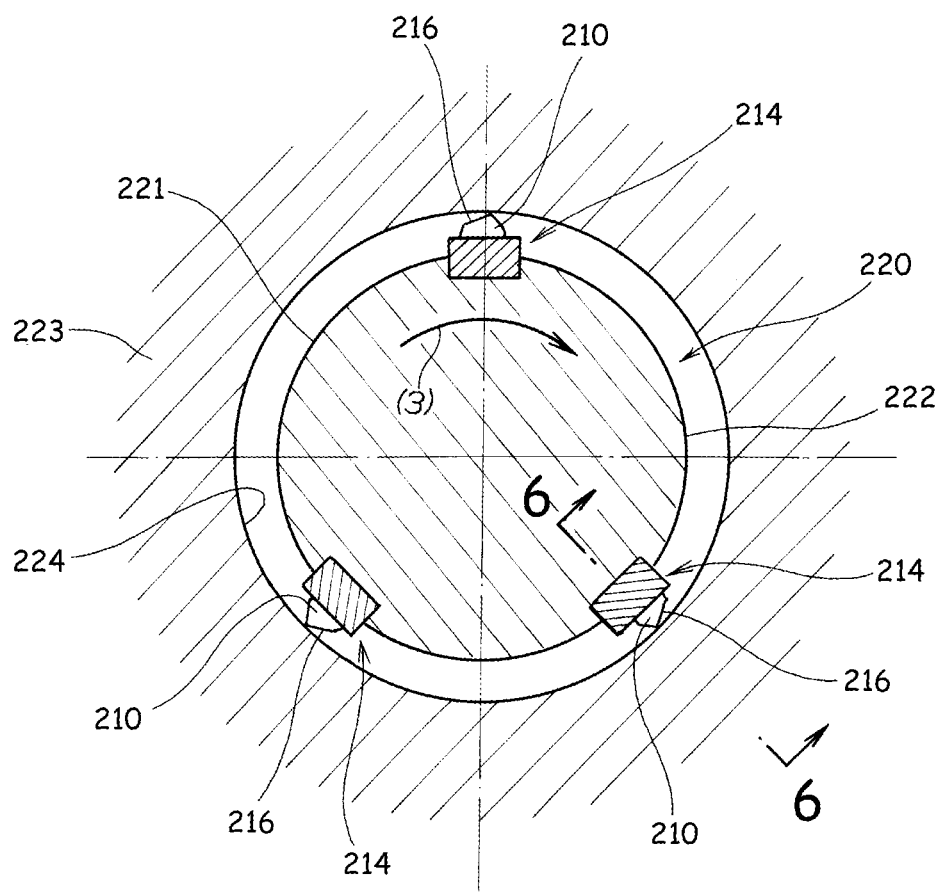
FIG. 5 is a cross-sectional view of a boring tool according to the second exemplary embodiment.

As illustrated in FIG. 5, a boring tool 220 includes a cylindrical shaft 221 and three rows of grindstones 214 provided on a circumference 222 of the shaft 221.
Explaining its operation, the boring tool 220 is rotated in a direction of the arrow (3), so that an inner peripheral surface (surface to be machined) 224 of a workpiece 223 is ground.

The rows of grindstones 214 are three in the second exemplary embodiment, but the present invention is not limited thereto. For example, the row may be appropriately varied depending upon a material or size of the workpiece 223, for example, four or five rows. Also, the height of the abrasive grain 210 is aligned.

Next, the grindstone 210 will be described with reference to a cross-sectional view.

Figure 6:
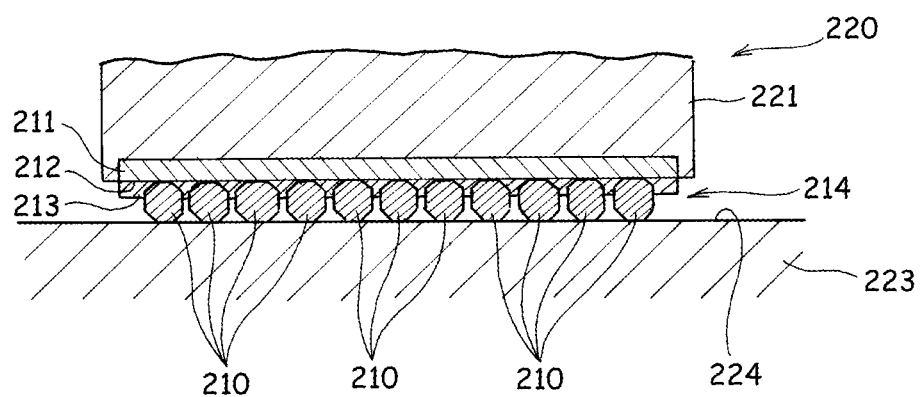
FIG. 6 is a cross-sectional view taken along the line 6-6 in FIG. 5.

As illustrated in FIG. 6, the grindstone 214 includes the base 211 and the plurality of abrasive grains 210 arranged in one row and bonded to the surface 212 of the base 211. As the plurality of abrasive grains 210 is arranged in one row, the relief surface 216 can be formed by once truing.

Meanwhile, in the second exemplary embodiment, the number of the abrasive grain 210 is one, but the present invention is not limited thereto. The number may be appropriately varied depending upon the material or size of the workpiece 223, for example, 20 or 30.

Next, the shape of the abrasive grain 210 will be described in detail.

Figure 7:
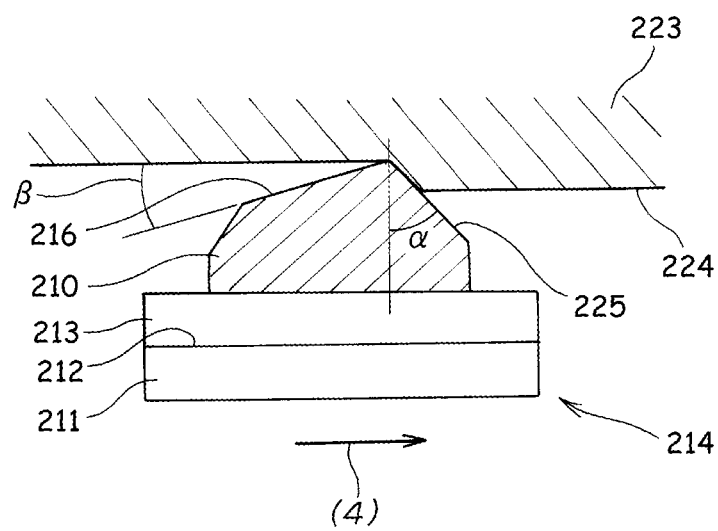
FIG. 7 is a cross-sectional view of an abrasive grain.

As illustrated in FIG. 7, the grindstone 214 includes the base 211 and the abrasive grain 210 bonded to the surface 212 of the base 211. The abrasive grain 210 consists of a rake surface 225 having a rake angle of an angle α which is not controlled, and a relief angle 216 having a relief angle of a predetermined angle β. The abrasive grains 210 illustrated in FIG. 6 have the same configuration. If the grindstone 214 is moved in a direction of the arrow (4) in FIG. 7, rub contact of the relief surface 216 is suppressed to a minimum, and thus a grinding resistance is decreased, thereby effectively grinding the workpiece 223 to be ground.

In addition, since the grinding resistance is decreased, it also has effects of suppressing chattering, bending influence due to deficient rigidity of the boring tool 220 (FIG. 5) or the work 223, and generation of burr.

Further, since a load applied to the boring tool 220, the rigidity or scale of the equipment can also be decreased.

Third Exemplary Embodiment

Next, a third exemplary embodiment of the present invention will be described with reference to the drawings. The same reference numerals have been used to identify the same or similar elements as those of the configuration illustrated in FIG. 6, and the description thereof will be omitted or in brief herein.

Figure 8:
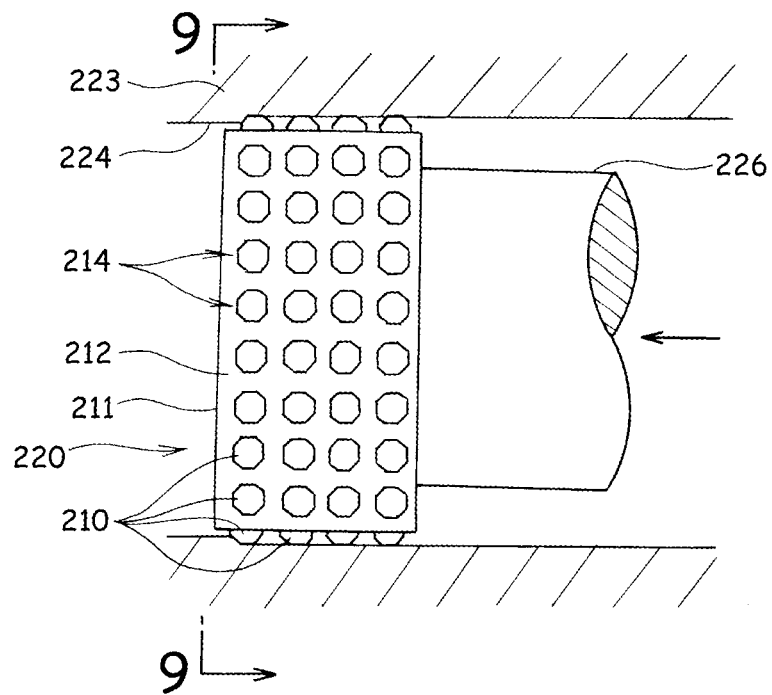
FIG. 8 is a side view of a boring tool according to a third exemplary embodiment.

As illustrated in FIG. 8, a front end portion of a shank 226 is provided with the boring tool 220. The grindstones 214 are disposed in plural rows, in which the plurality of abrasive grains 210 are arranged in one row and bonded to the surface 212 of the base 211 which is the circumference of the boring tool 220.

Next, the position relationship between the boring tool 220 and the workpiece 223 will be described.

Figure 9:
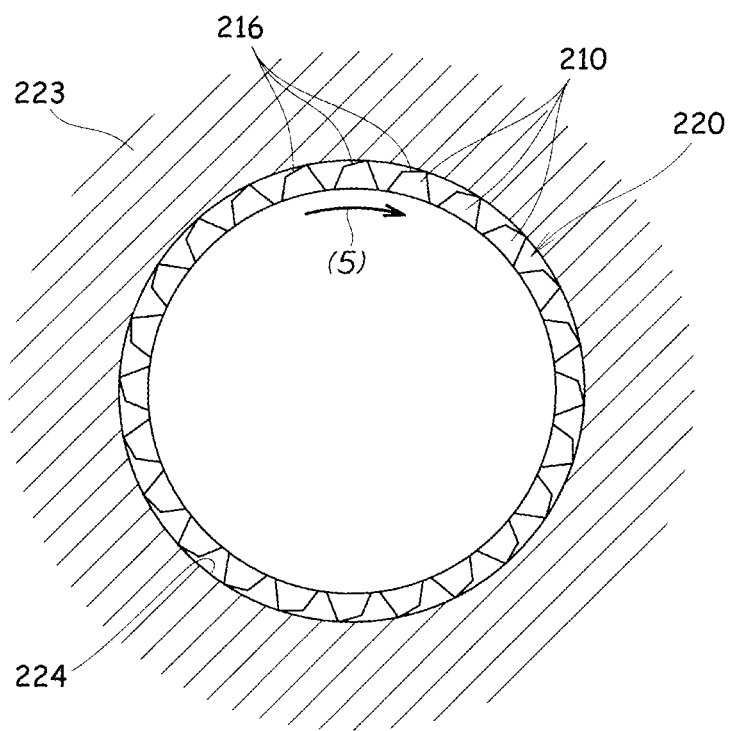
FIG. 9 is a cross-sectional view taken along the line 9-9 in FIG. 8

As illustrated in FIG. 9, the abrasive grains 210 provided on the boring tool 220 are brought in contact with the inner peripheral surface 224 of the workpiece 223.

Explaining its operation, as the boring tool 220 is rotated in a direction of the arrow (5), the inner peripheral surface 224 of the workpiece 223 is ground.

Meanwhile, the number of the rows of the abrasive grains 210 may be appropriately varied depending upon the workpiece 223 or the machining condition.

Fourth Exemplary Embodiment

Next, a fourth exemplary embodiment of the present invention will be described with reference to the drawings. The same reference numerals have been used to identify the same or similar elements as those of the configuration illustrated in FIG. 5, and the description thereof will be omitted or in brief herein.

Figure 10:
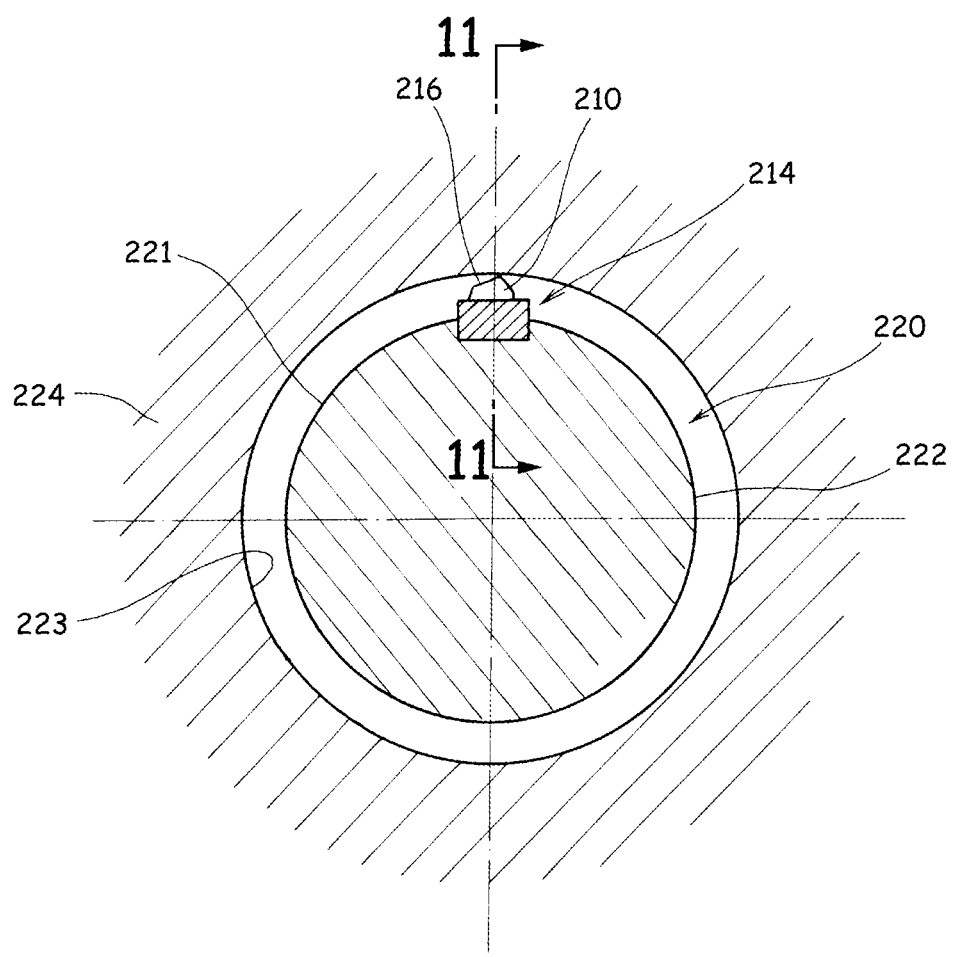
FIG. 10 is a cross-sectional view of a line boring bar according to a fourth exemplary embodiment.

As illustrated in FIG. 10, the boring tool 220 (line boring bar 220) includes a cylindrical shaft 221 and one row of grindstones 214 provided on a circumference 222 of the shaft 221. The boring tool 220 is rotated to grind a journal hole 228 of a cylinder block 227.

Next, the line boring bar 220 will be described with reference to the cross-sectional view.

Figure 11:
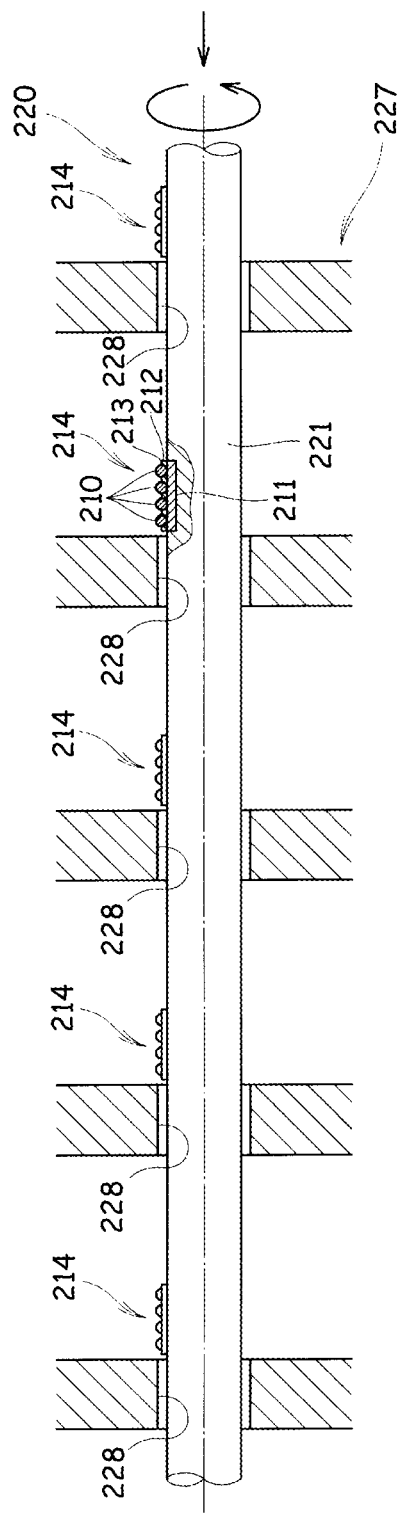
FIG. 11 is a cross-sectional view taken along the line 11-11 in FIG. 10.

As illustrated in FIG. 11, the line boring bar 220 includes a plurality of grindstones 214 arranged in an axial direction on the cylindrical shaft 221. Each of the grindstones 214 has the base 211 and a plurality of abrasive grains 210 arranged in one row and bonded to the surface 212 of the base 211. Since the plurality of abrasive grains 210 arranged in one row is used, the journal hole 228 of the cylindrical block 227 can be effectively ground by the grindstones 214.

Figure 12:
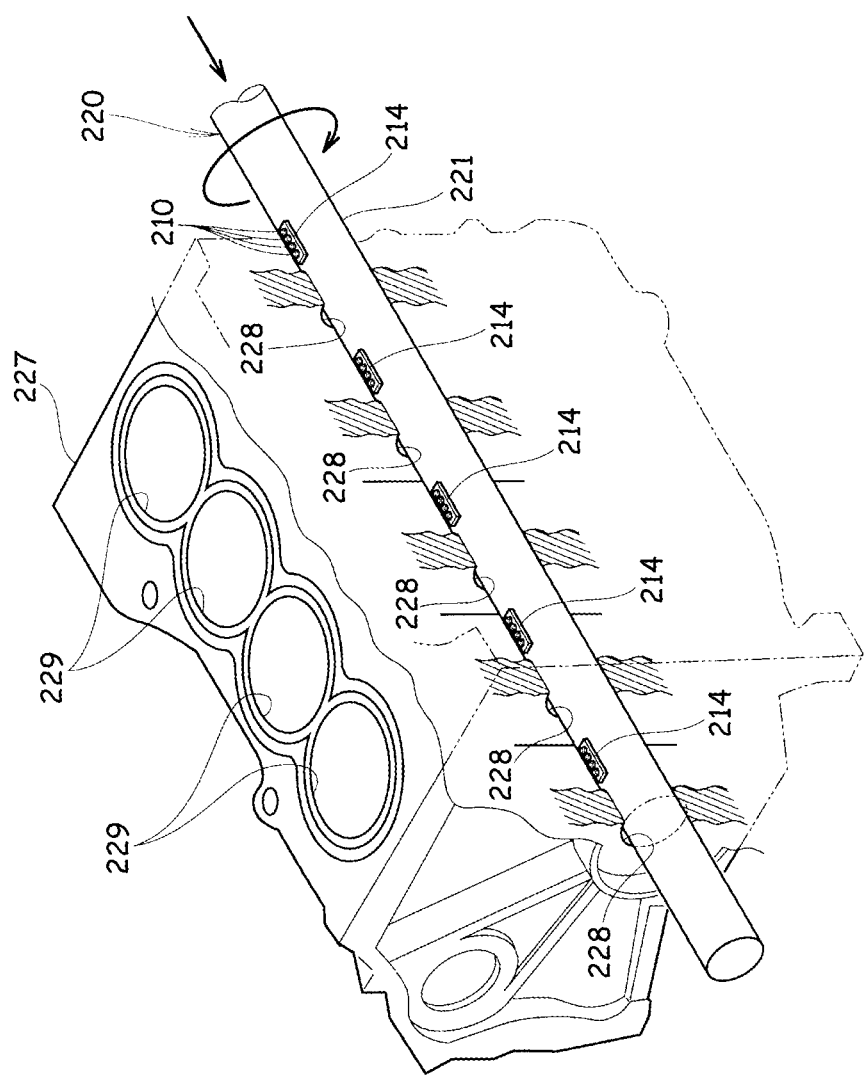
FIG. 12 is a perspective view of the line boring bar according to the fourth exemplary embodiment.

As illustrated in FIG. 12, the cylinder block 227 of the engine includes the cylinder 227 and the journal hole 228. For example, for a 4-cylinder engine, five bearings are installed in the journal holes 228. The line boring bar 220 is inserted into the journal holes 228 in a state in which an axis of the line boring bar 220 is slightly shifted in a few millimeters toward a side opposite to the side attached with the grindstones 214. And then, the line boring bar 220 is returned to its original state, and is rotated to simultaneously machine the plurality of journal holes 228.

Fifth Exemplary Embodiment

Next, a fifth exemplary embodiment of the present invention will be described with reference to the drawings. The same reference numerals have been used to identify the same or similar elements as those of the configuration illustrated in FIG. 6, and the description thereof will be omitted or in brief herein.

Figure 13:
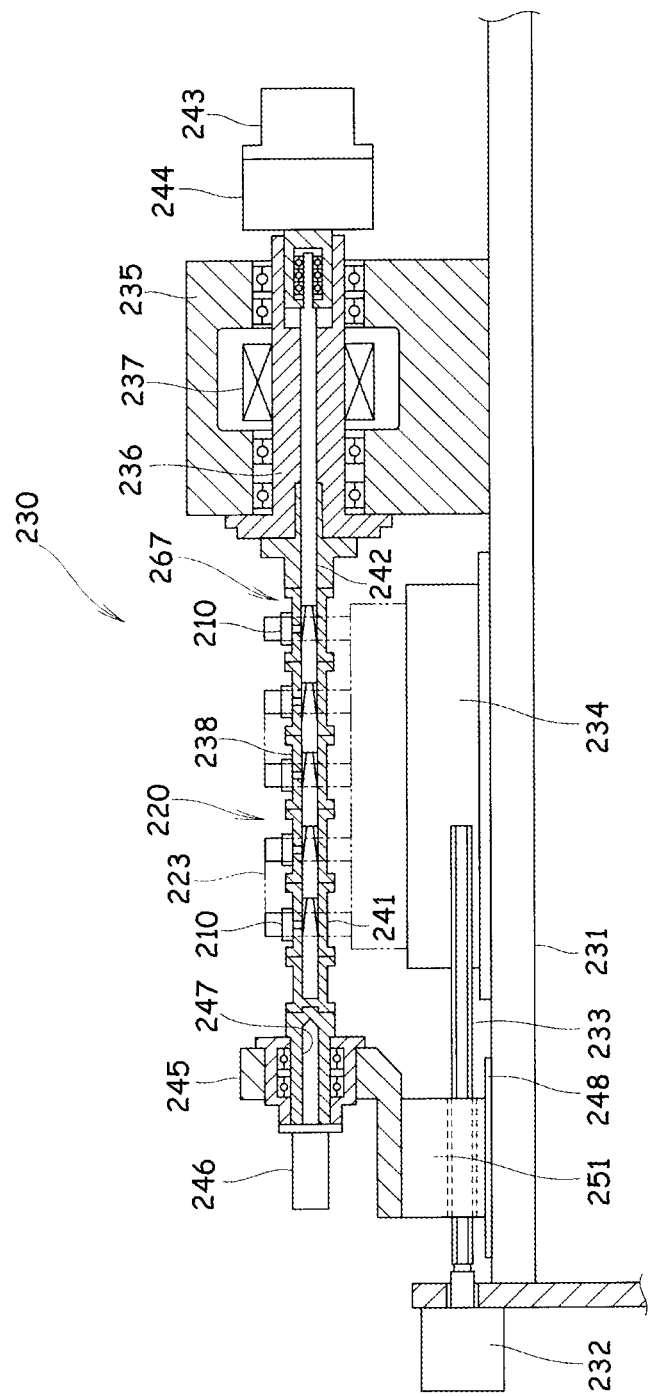
FIG. 13 is a cross-sectional view of a grinding apparatus employing a boring tool according to a fifth exemplary embodiment.

As illustrated in FIG. 13, a grinding apparatus 230 includes a base stand 231, a motor 232 attached to the base stand 231, a ball screw 233 rotatably attached to the motor 232, and a table 234 which is movable to the base stand 231 by the ball screw 233. The workpiece 223 is fixed to the table 234.

Also, the grinding apparatus 230 includes a main bearing 235 of the boring tool 220 fixed to the base stand 231, a main shaft 236 rotatably provided in the main bearing 235, and a spindle motor 237 provided in the main bearing 235 to rotate the main shaft 236. A cylindrical tool holder 238 is attached to one end of the main shaft 236, and the tool holder 238 couples a plurality of tool holders 241 in an axial direction.

A draw bar 242 is inserted and penetrated in the tool holder 238 and the main shaft 236. The other end of the main shaft 236 is provided with a tension member 244 which is moved in an axial direction by a thrust motor 243. The draw bar 242 is connected to the tension member 244.

The side of tool holder 238 opposite to the main shaft 236 is rotatably maintained by a spindle receiver 245. A front end portion of the tool holder 238 is attached with a cutting-oil supply portion 246 for supplying cutting oil, and the cutting oil is supplied from the cutting-oil supply portion 246 to a cutting-oil passage 247 formed in the tool holder 238.

The base stand 231 is provided with a rail 248 along the axial direction of the main shaft 236, and a movable table 251 is movably provided on the rail 248. The spindle receiver 245 is supported by the movable table 251.

Also, the boring tool 220 is provided at a position corresponding to the workpiece 223.

Figure 14:
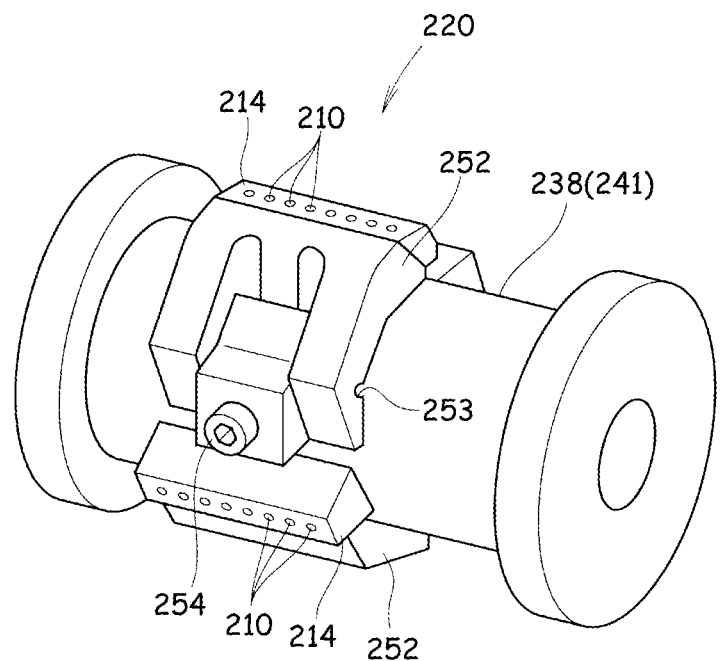
FIG. 14 is a perspective view of the boring tool according to the fifth exemplary embodiment.

As illustrated in FIG. 14, the boring tool 220 includes the tool holder 238, a plurality of arms 252 swingably provided on the tool holder 238 and having the grindstone 214 at its front end portion, and grooves 253 provided in these arms 252 and formed in parallel with the axis of the tool holder 238, and bolts 254 for securing the arms to the tool holder 238.

The boring tool 220 will be described with reference to a cross-sectional view taken along an axial direction.

Figure 15:
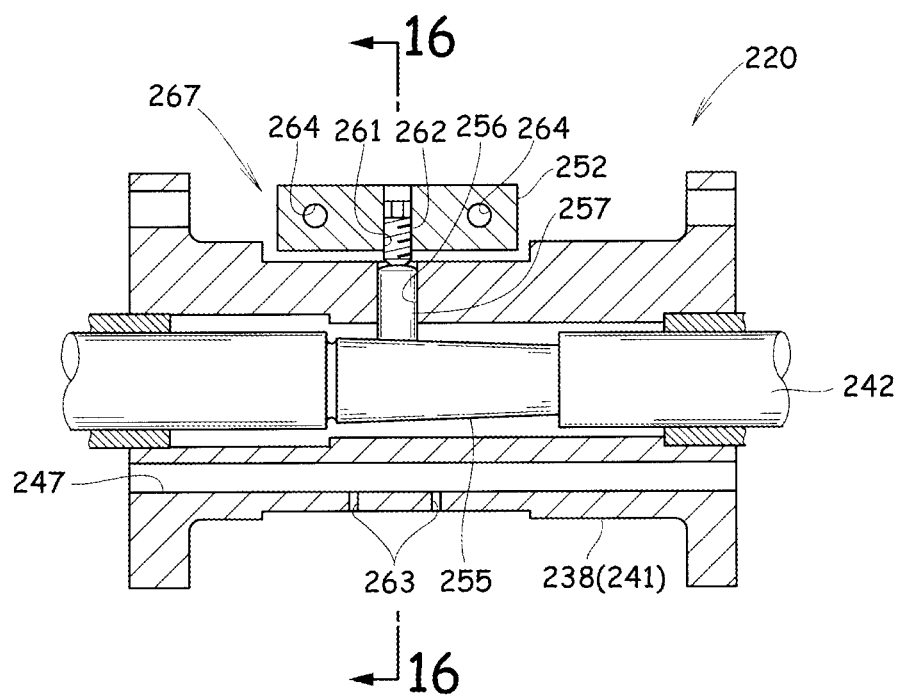
FIG. 15 is a cross-sectional view of the boring tool according to the fifth exemplary embodiment.

As illustrated in FIG. 15, in the boring tool 220, the draw bar 242 penetrates through the tool holder 238. The draw bar 242 is provided with a tapered portion 255 for expanding or retracting the arm 252 in a diameter direction of the tool holder 238.

In addition, the tool holder 238 is provided with a through-hole 256 in the diameter direction. A pin 257 is slidingly received in the through-hole 256, and comes in contact with the tapered portion 255.

The arm is provided with a threaded hole 261, and an adjustment screw 262 is provided in the threaded hole 261. One end portion of the adjustment screw 262 abuts against an end portion (edge) of the pin 257.

Also, the tool holder 238 is provided with a nozzle hole 263 which is connected to the cutting-oil passage 247, so that the cutting oil is supplied from the cutting-oil passage 247 through the nozzle hole 263 to a surface to be ground.
A reference numeral 264 denotes a threaded hole for attaching the grindstone 214 (FIG. 14).

Figure 16:
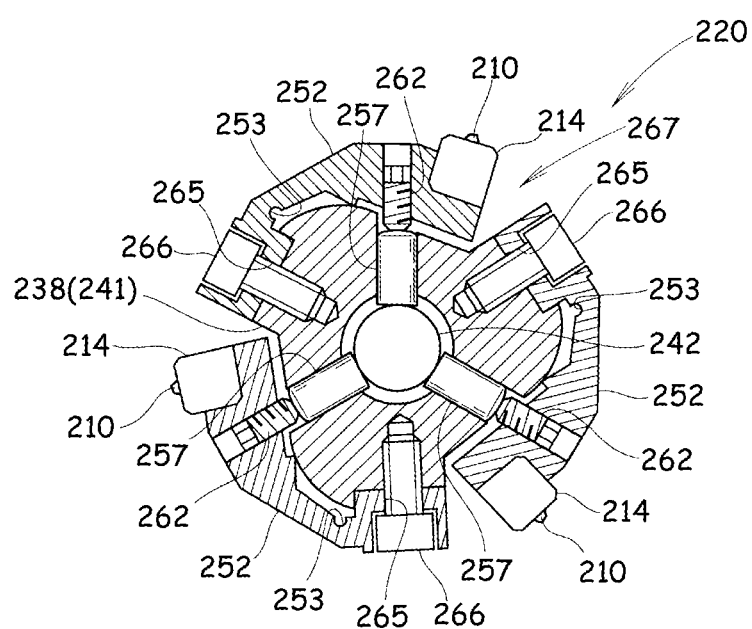
FIG. 16 is a cross-sectional view taken along the like 16-16 in FIG. 15.

As illustrated in FIG. 16, the arm 252 has a shape to suit the circumference of the tool holder 238. The arm 252 is attached to the tool holder 238 by a bolt 266 penetrating an attachment hole 265 provided on its base end side. The front end side of the arm 252 is provided with a threaded hole 264 (FIG. 15) for a bolt which is used to attach the grindstone 214. The grindstone 214 is attached to the arm 252 by the bolt.

Three arms 252 are provided in a circumferential direction of the draw bar 242 at equal intervals, so that a balance of rotation is maintained. Also, even though a plurality of grindstones 214 are provided in a spaced state in the circumferential direction of the draw bar 242, a rotational axis of the tool holder 238 and the plurality of grindstones 214 are maintained in a balance, when the diameter of the grindstone 214 is increased, thereby maintaining the grinding precision. A diameter enlarging mechanism 267 for enlarging the diameter of the arm 252 consists of the tool holder 238, the draw bar 242, the pin 242 and the adjustment screw 262.

Meanwhile, the number of the arms 252 is three in the fifth exemplary embodiment, but four or five arms may be provided. If the grinding can be performed by enlarging the diameter of the arm 252, the arms 252 may be provided in plural.

The operation of the grinding apparatus 230 described above will now be described.

In FIG. 15, the draw bar 242 is moved to a right side in the drawing, and the pin 257 is pushed up. The arm 252 contacting the pin 257 is opened around the groove 253, and the diameter of the grindstone 214 is increased. In this way, a protruding amount of the plurality of grindstones 214 all in the diameter direction is adjusted in accordance with the moving amount of the draw bar 242.

Also, the distance between the pin 257 and the arm 252 is adjusted by turning the adjustment screw 262, so that the protruding amount of the respective grindstones 214 in the diameter direction can be adjusted.

After the protruding amount of the grindstone 214 is adjusted, the center of the hole of the workpiece 223 laid on the table 234 is aligned with the axis of the boring tool 220. After the tool is inserted by decreasing the diameter, it is enlarged to a predetermined diameter, and then the table 234 is moved along the shaft of the tool holder 238 to simultaneously grind the inner diameter of the hole of the workpiece 223.

According to the second exemplary embodiment to the fifth exemplary embodiment, as illustrated in FIG. 7, in the grindstone 214 with the plurality of abrasive grains 210 being arranged and bonded to the surface 212 of the base 211 in a row, the plurality of abrasive grains 210 all may be provided with a relief surface 216 having a predetermined angle $\beta$. That is, the relief surfaces 216 of the plurality of abrasive grains 210 may be position to be flush with each other.

With the configuration, since all abrasive grains 210 is provided with the relief surface 216 having a predetermined angle β, the grinding resistance can be further reduced, and the precision of the finished surface can be further improved.

As illustrated in FIG. 5, the grindstone 214 may be a grindstone 214 for boring.

Since inner-diameter machining is generally restricted to the shape or circumferential velocity of the tool, rather than the outer-diameter machining, it is sometimes difficult to produce the precision of the finished surface. If the grindstone 214 for boring according to the present invention is used for the finishing of the hole diameter, it is possible to further improve the finishing precision of the hole.

As illustrated in FIG. 12, the boring tool includes the cylindrical shaft 221 and the plurality of grindstones 214 arranged in the axial direction on the cylindrical shaft 221.

With the configuration, for the machining of the journal hole 228 of the cylinder block 227, for example, the four-cylinder block 227, five bearings are necessarily machined, and thus the tool may be a long axis, or aluminum and iron may be simultaneously ground depending upon the kind. As a result, it is difficult to produce the precision of the finished surface. In this respect, it is possible to further improve the finishing precision of the journal hole 228 by using the boring tool 220.

As illustrated in FIG. 16, the boring tool may include the arm 252 expanded in the circumferential direction by the diameter enlarging mechanism 267, and the grindstone 214 provided on the front end of the arm 252.

With the configuration, since the diameter is adjusted by the diameter enlarging mechanism 267, the finishing machining of different diameter can be performed by using one boring tool. For this reason, since a plurality of boring tools is not required, the cost of the boring tool 220 can be decreased. Also, for example, in the machining of the journal hole 228 of the cylinder block 227, if plural diameter enlarging tools 267 are provided in the axial direction of the tool (boring tool 220), a plurality of bearing portions can be simultaneously machined by retracting the diameter and then introducing the tool, while including the plurality of grindstones 214 in the circumferential direction. For this reason, it is possible to shorten a cycle time. Also, it is possible to fit the reduction in machining diameter due to grindstone abrasion.

In the second exemplary embodiment to the fifth exemplary embodiment, the boring tool 220 is applied to the shaft 221 having the constant diameter, but a boring tool including a diameter enlarging means for enlarging the diameter of the grindstone 214 to make the abrasive grain 210 contact with the inner peripheral surface 224 may be applied to the shaft 221.

Sixth Exemplary Embodiment

Figure 17:
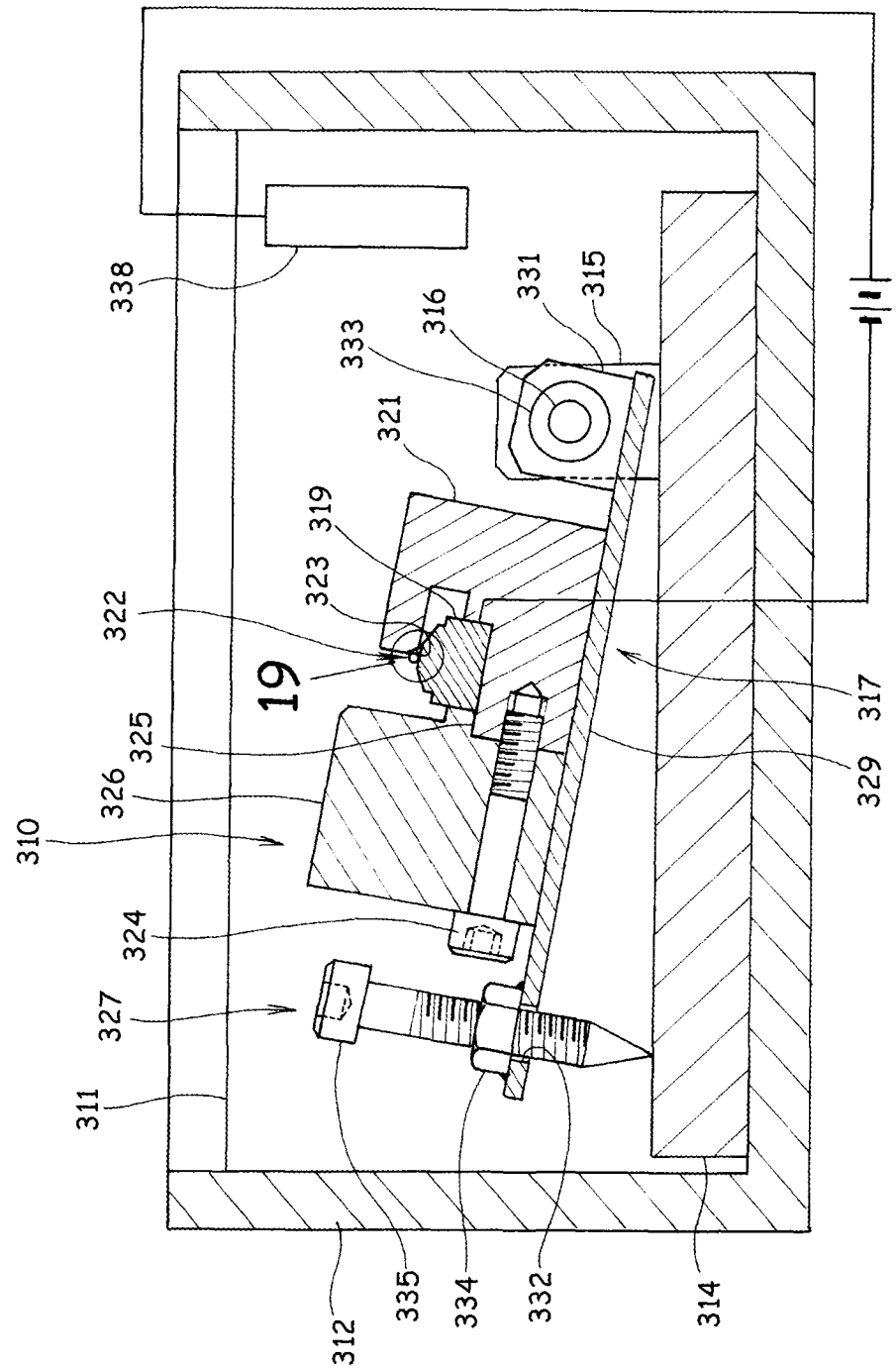
FIG. 17 is a diagram illustrating a plating apparatus equipped with an abrasive grain positioning jig according to a sixth exemplary embodiment.

As illustrated in FIG. 17, an abrasive grain positioning jig 310 according to the sixth exemplary embodiment is provided in a plating bath 312 filled with a plating solution 311. The abrasive grain positioning jig 310 provided in the plating bath 312 includes a shaft 314, a column 315 stood from the shaft 314, a pivot plate 317 swingably supported via a pin 316 connected to the column 315 and inclined to a horizontal direction, a support member 321 supported by the pivot plate 317 and supporting a base 319 of a grindstone, a contact portion 323 extending from the support member 321 to the base 319 and coming in contact with an abrasive grain 322, a fixing member 326 detachably provided on the support member 321 by a bolt 324 and fixing the base 319 laid on a set surface 325 of the support member 321, and an angle adjustment mechanism 327 for adjusting an inclined angle of the pivot plate 317.

The support member 321 and the fixing member 326 are made from an insulator, and are not plated in a plating process which is performed later.

The pivot plate 317 includes a body portion 329 supporting the support member 321 or the fixing member 326, a connection portion 331 stood from one end of the body portion 329 and connected to the column 315 via the pin 316, and a hole 332 provided in the other end of the connection portion 331, in which the angle adjustment mechanism 327 is provided. The connection portion 331 is prevented from falling in the front of the drawing by a stop member 333.

The angle adjustment mechanism 327 includes a nut 334 welded to the upper surface of the hole 332 formed in the pivot plate 317, and a bolt 335 screwed to the nut 334 and having a front end which is formed in a conical shape.

By turning the bolt 335, the pivot plate 317 is pivoted. As the pivot plate 317 is pivoted, the inclined angle of the body portion 329 to the horizontal direction is adjusted.

The fixing member 326 is connected to the support member 321, after the base 319 is laid on the set surface 325 of the support member 321. That is, after base 319 is laid, the fixing member 326 is brought in contact with the side of the support member 321, and then the fixing member and the support member are fixed by the bolt 324. After fixing, the abrasive grain 322 is placed on the upper surface 337 of the base 319.

The nickel plate 338 is provided in the plating bath 312, in addition to the abrasive grain positioning jig 310. The nickel plate 338 is connected to the anode, while the base 319 is connected to the cathode.

A method of arranging the abrasive grain 322 will be described in detail later with reference to the next drawing.

Figure 18:
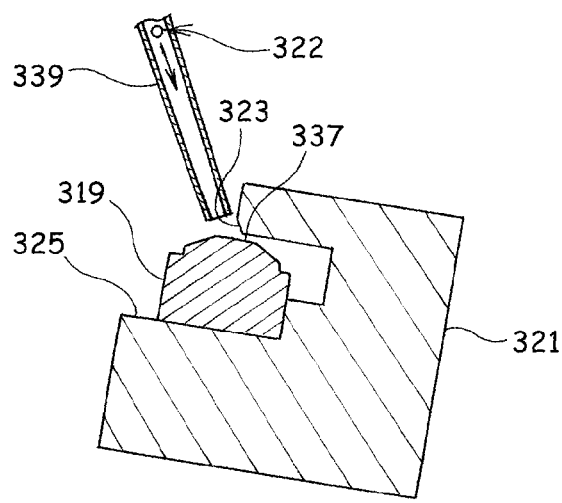
FIG. 18 is a diagram illustrating a placement process of an abrasive grain.

As illustrated in FIG. 18, in order to accurately lay the abrasive grain 322 on the upper surface 337 of the base 319 in the plating bath, a cylindrical guide member 339 is utilized. The front end of the guide member 339 is opposite to the upper surface 337 of the base 319, and the abrasive grain 322 is fallen in the guide member 339.

The fallen abrasive grain 322 slides and rolls over along the upper surface 337 of the inclined base 319. It will be described in detail later with reference to the next drawing.

Figure 19:
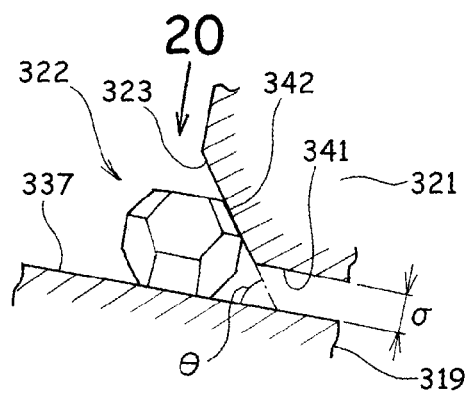
FIG. 19 is an enlarged view of a section indicated by the reference numeral 19 in FIG. 17.

As illustrated in FIG. 19, as the support member 321 (FIG. 18) is inclined, the upper surface 337 of the base 319 is also inclined. The abrasive grain 322 arriving at the upper surface 337 of the inclined base 319 slides and rolls over along the upper surface 337 of the inclined base 319 until coming in contact with the contact portion 323.

A bottom portion 341 extending from the lower end of the contact portion 323 is spaced apart from the upper surface 337 of the base 319 by a predetermined distance σ.

The contact portion 323 is provided to have a predetermined angle θ to the upper surface 337 of the base 319. The predetermined angle θ is equal to an angle formed by a rake surface 342 of the abrasive grain 322 grinding the workpiece to the upper surface 337 of the base 319. By setting the angle of the contact portion to the upper surface 337 of the base 319 as the predetermined angle θ and inclining the base 319, the rake surface 342 of the abrasive grain 322 comes in contact with the contact portion 323.

A vibration mechanism may be provided in the support member 321. As vibration is applied to the base 319 or the abrasive grain 322 via the support member 321, the rake surface 342 can reliably come in contact with the contact portion 323. Also, since the time arriving at the contact portion 323 speeds up, it is possible to shorten the work of manufacturing the grindstone.

The abrasive grains 322 arranged on the upper surface 337 of the base 319 will be described in detail with reference to the next drawing.

Figure 20:
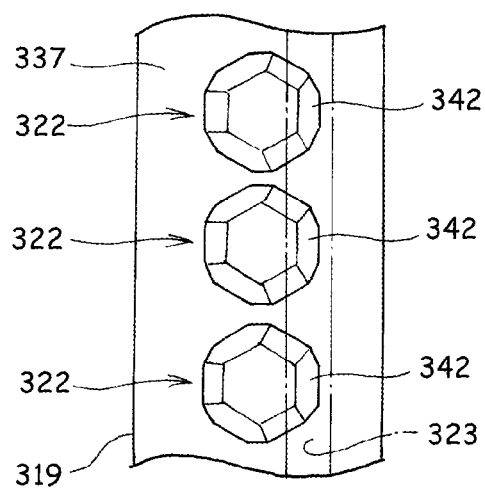
FIG. 20 is a diagram when seen from a direction of the arrow 20 in FIG. 19.

As illustrated in FIG. 20, the abrasive grains 322 arranged toward the longitudinal direction of the base 319 are arranged in the same direction, as the rake surfaces 342 are brought in contact with the contact portion 323. That is, the rake surfaces are arranged in an aligned state. In particular, in the case where the abrasive grain 322 uses the truncated octahedron shape, a hexagonal surface having more large area comes easily in contact with the upper surface 337 of the base 319 and the contact portion 323.

In the state in which the rake surface 342 of the abrasive grain 322 comes in contact with the contact portion 323, the plating process is carried out. That is, in the state in which the abrasive grains 322 are arranged so that the rake surfaces 342 are overlapped in the longitudinal direction, and the rake surfaces 342 are arranged on the same surface, the plating process is carried out.

As illustrated in FIG. 19, as the distance from the upper surface 337 of the base 319 to the bottom portion 341 is set as σ, the plating process can be carried out, with the abrasive grains 322 coming in contact with the contact portion 323. While the rake surface 342 is maintained in the aligned state, the abrasive grains 322 can be bonded to the base 319.

Figure 21:
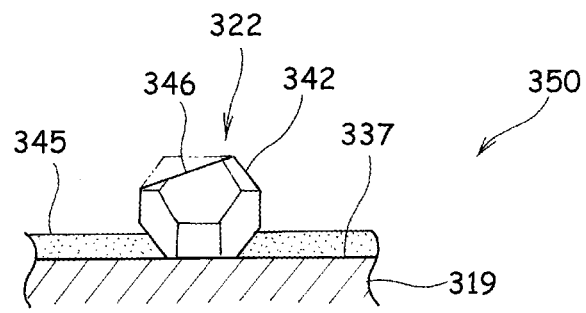
FIG. 21 is a diagram illustrating a relief surface forming process.

As illustrated in FIG. 21, after the abrasive grains 322 are bonded to the upper surface 337 of the base 319 via the plating layer 345, the base 319 is removed from the plating solution 311 (FIG. 17). After removing, the abrasive grains 322 are ground to form relief surfaces 346. As the relief surfaces 346 are formed, the grindstone 350 is completed.

Figure 22A:
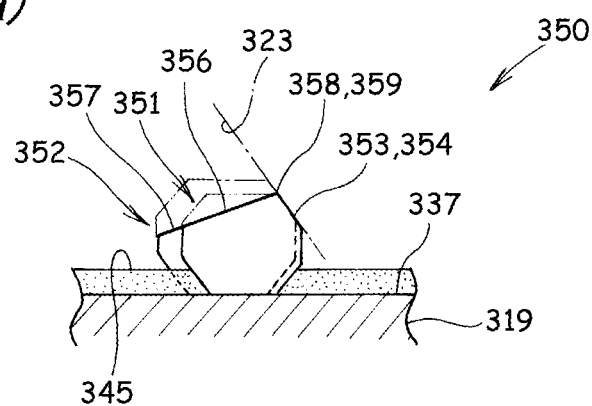
FIGS. 22(a) and 22(b) are diagrams illustrating an operation of a grindstone manufacturing method according to the sixth exemplary embodiment.

As illustrated in FIG. 22(a), a plurality of abrasive grains 351 and 352 are provided on the upper surface 337 of the base 319 along the longitudinal direction, and the size of these abrasive grains 351 and 352 may be different. However, since these abrasive grains 351 and 352 are subjected to the plating process in the state in which the abrasive grains come in contact with the contact portion 323, the rake surfaces 353 and 354 are disposed on the same surface.

Also, as the rake surfaces 353 and 354 are disposed and arranged on the same surface, the height of the rake surfaces 353 and 354 is aligned when the relief surfaces 356 and 357 are formed. That is, an edge portion 358 positioned between the rake surface 353 and the relief surface 356 and an edge portion 359 positioned between the rake surface 354 and the relief surface 357 are overlapped when the grindstone 350 is seen from the longitudinal direction.

Figure 22B:
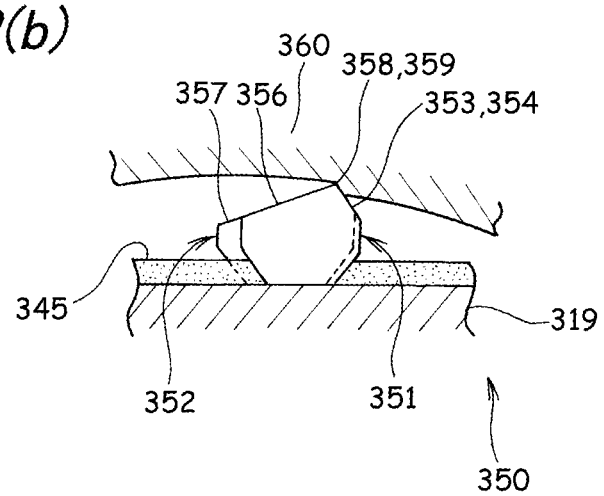

As illustrated in FIG. 22(b), by using the grindstone 350 in which the height is aligned and the rake surfaces 353 and 354 are provided on the same surface, a workpiece 360 can be uniformly ground. As a result, it is possible to prevent a difference from occurring in the grinding state of the same workpiece 360. Also, it is possible to decrease a difference in the grinding precision depending upon a kind of grindstone.

According to the sixth exemplary embodiment, the abrasive grains 351 and 352 are bonded to the base 319 in the state in which the rake surfaces 353 and 354 are aligned in advance. After bonding, a yield of the abrasive grains can be improved, as compared to a method of grinding the abrasive grain. Since the yield of the abrasive grain is high, a lifespan of the grindstone can be preferably extended.

In the method of manufacturing the grindstone according to the sixth exemplary embodiment, the abrasive grains are bonded to the base by the plating layer in the state in which the rake surfaces are arranged on the same surface. The abrasive grains are bonded to the base by the plating layer in the state in which the rake surfaces are arranged on the same surface. The rake surfaces of the abrasive grains can be arranged by bonding the abrasive grains in the state in which the rake surfaces are on the same surface. If the grindstone with the rake surfaces arranged is utilized, the workpiece can be uniformly ground.

Also, the abrasive grain positioning jig 310 includes a contact portion which is brought in contact with a predetermined surface of the abrasive grain arranged toward one surface of the inclined base. As the base is inclined, the abrasive grain slides and rolls over along one surface of the base to the contact portion. The contact portion is provided an angle to be brought in contact with a predetermined surface of the abrasive grain. As the contract portion is provided at the angle to be brought in contact with the predetermined surface of the abrasive grain, most abrasive grains rolling over along the one surface of the base comes in contact with the contact portion at the predetermined surface.

As the abrasive grains are bonded to the base in the state in which the predetermined surface comes in contact with the contact portion, the grindstone with the rake surfaces arranged can be obtained. The workpiece can be uniformly ground by using the grindstone with the rake surfaces arranged.

The abrasive grains are bonded to the base by the nickel plating in the sixth exemplary embodiment, but the present invention is not limited to the nickel plating. Any method can be employed, even though the abrasive grains are bonded to the base.

Seventh Exemplary Embodiment

A seventh exemplary embodiment will now be described with reference to the drawings.

Figure 23:
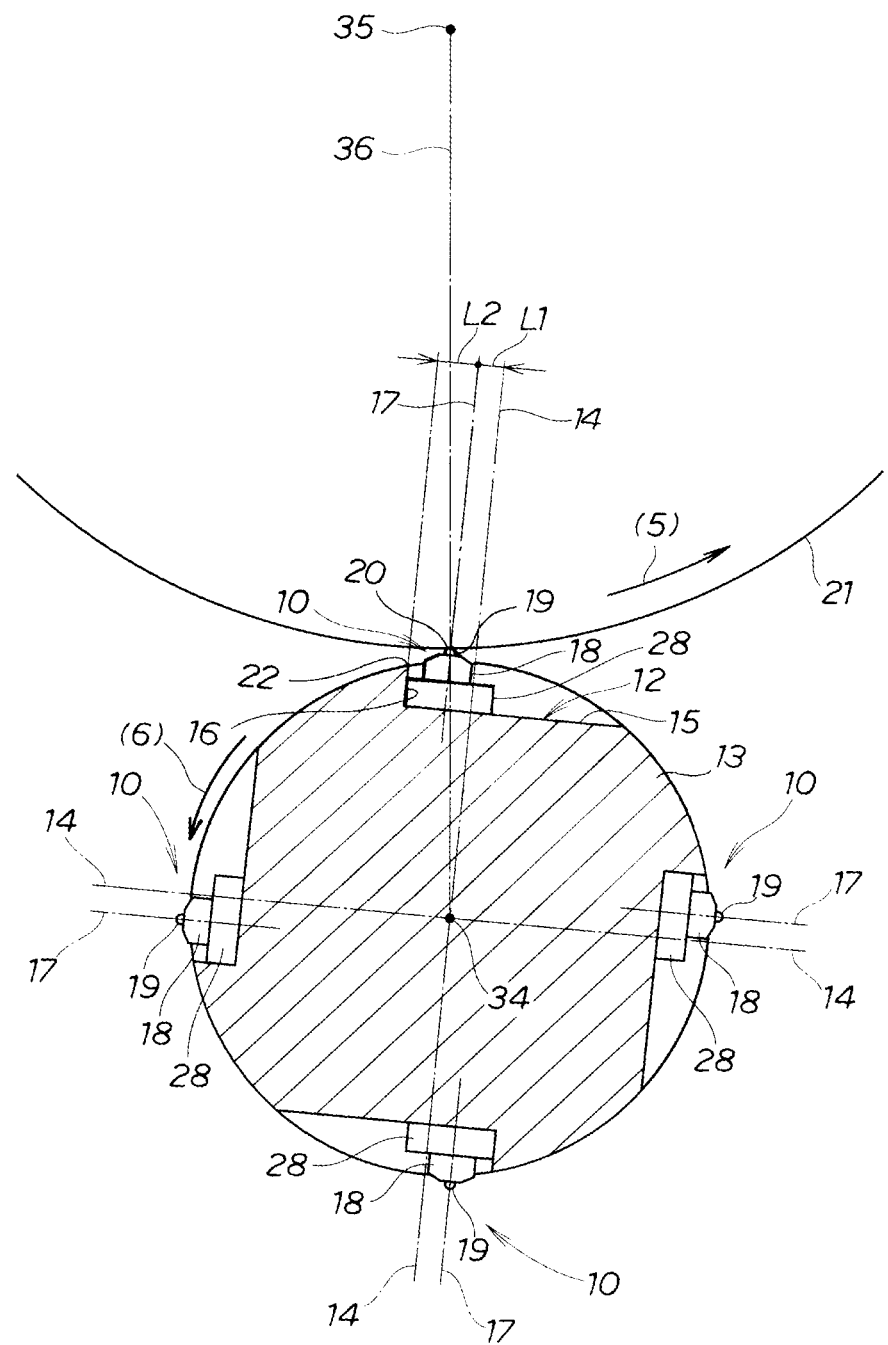
FIG. 23 is a diagram illustrating a position relationship between a truing grindstone and a grindstone according to a seventh exemplary embodiment.

As illustrated in FIG. 23, a cylindrical rotating tool 13 is provided on its circumference with grindstone pockets 12 for receiving a grindstone 10. The grindstone 10 for grinding the workpiece is fixed to the grindstone pocket 12.

The grindstone pocket 12 includes a bottom surface 15 vertically intersecting with a normal line 14 of the rotating tool 13, and a lateral surface 16 parallel with the normal line 14 of the rotating tool 13. A line 17 passing the center of the abrasive grain is offset from the normal line 14 of the rotating tool 13 by a distance L1. Also, a distance between the line 17 passing the center of the abrasive grain and the lateral surface 16 of the grindstone pocket 12 is set as L2. The distance between the normal line 14 of the rotating tool 13 and the lateral surface 16 of the grindstone pocket 12 is set as L1+L2.

The grindstone 10 includes a body portion 28, an abrasive grain bonding portion 18, and an abrasive grain 19 bonded to the abrasive grain bonding portion 18. In the process of bonding the abrasive grain 19 to the relief surface 20, the abrasive grain 19 is disposed so that the line 17 passing the center of the abrasive grain coincides with the position which is offset by the distance L1 from the normal line 14 of the rotating tool 13.

While a truing grindstone 21 for bonding the abrasive grain 19 to the relief surface 20 comes in contact with the abrasive grain, the truing grindstone 21 is rotated in a direction indicated by the arrow (5), and the rotating tool 13 is rotated in a direction indicated by the arrow (6), thereby forming the relief surface 20 on the abrasive grain 19.

In this instance, the abrasive grain 19 is positioned on the center line 17 of the grindstone 10 offset by the distance L1 from the normal line 14.

At the process of bonding the relief surface, since the abrasive grain 19 is disposed at the position which is offset by the distance L1 toward the left in the drawing rather than the normal line 14 of the rotating tool 13, the rotating tool 13 is fast rotated as the arrow (6), so that the uniform relief surface 20 of high precision can be formed on the plurality of abrasive grains 19 all provided on the circumference of the rotating tool 13 for a short time.

Next, the process of fixing the grindstone 10 to the rotating tool 13 will be described.

Figure 24:
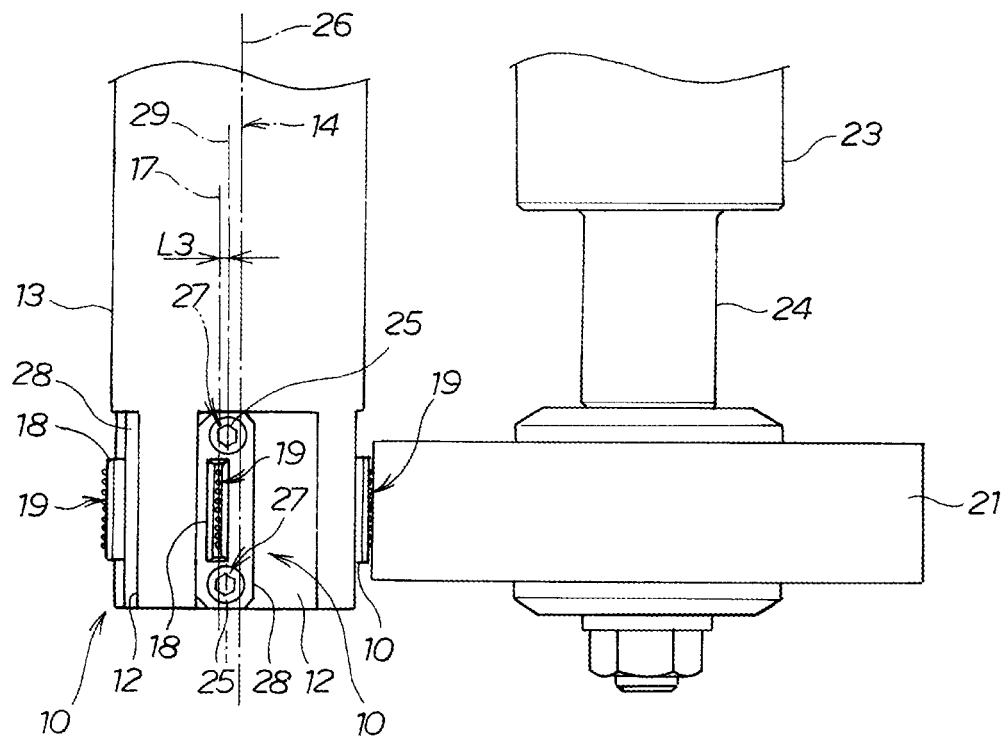
FIG. 24 is a plan view of the grindstone according to the seventh exemplary embodiment.

As illustrated in FIG. 24, the truing grindstone 21 is fixed to the rotating shaft 24 of a forming device 23. Also, the rotating tool 13 is detachably provided on the rotating shaft, and the grindstone pocket 12 for receiving the grindstone 10 is provided on the circumference of the rotating tool 13. The grindstone 10 is fixed to the grindstone pocket 12 by a fixing member 25.

The grindstone 10 includes a tube-shaped body portion 28 extending along an axis 26 of the rotating shaft, the abrasive grain bonding portion 18 provided on the body portion 28 and extending along the axis 26 of the rotating shaft, the abrasive grains 19 bonded to the abrasive grain bonding portion 18 in the state in which the abrasive grains are arranged in one row in parallel with the axis 26 of the rotating shaft, the fixing member 25 fixing the grindstone 10 to the rotating tool 13, and a fixing hole 27 provided in the body portion 28 through which the fixing member 25 passes. In addition, the axis 26 of the rotating shaft is overlapped with the normal line 14. The fixing hole 27 is formed on an offset line 29 which is offset by a predetermined distance L3 from the line passing the center of the abrasive grains arranged in one row.

In the process of fixing the grindstone 10 to the rotating tool 13, the abrasive grain 19 of the grindstone 10 is disposed at the left side of the drawing rather than the axis 26, and the grindstone 10 is fixed to the rotating tool 13 by the fixing member 25.

The abrasive grain bonding portion 18 and the body portion 28 are explained as a separate component in this embodiment, but the abrasive grain bonding portion 18 and the body portion 28 may be an integral component. In the case where abrasive grain bonding portion 18 and the body portion 28 are an integral component, the integral component is referred to as the abrasive grain bonding portion 18. Also, the grindstone 10 includes the abrasive grain bonding portion 18 extending along the axis 26 of the rotating shaft and bonded with the abrasive grain 19, the abrasive grains 19 bonded to the abrasive grain bonding portion 18 in the state in which the abrasive grains are arranged in one row in parallel with the axis 26 of the rotating shaft, the fixing member 25 fixing the grindstone 10 to the rotating tool 13, and the fixing hole 27 provided in the body portion 28 through which the fixing member 25 passes.

Figure 25:
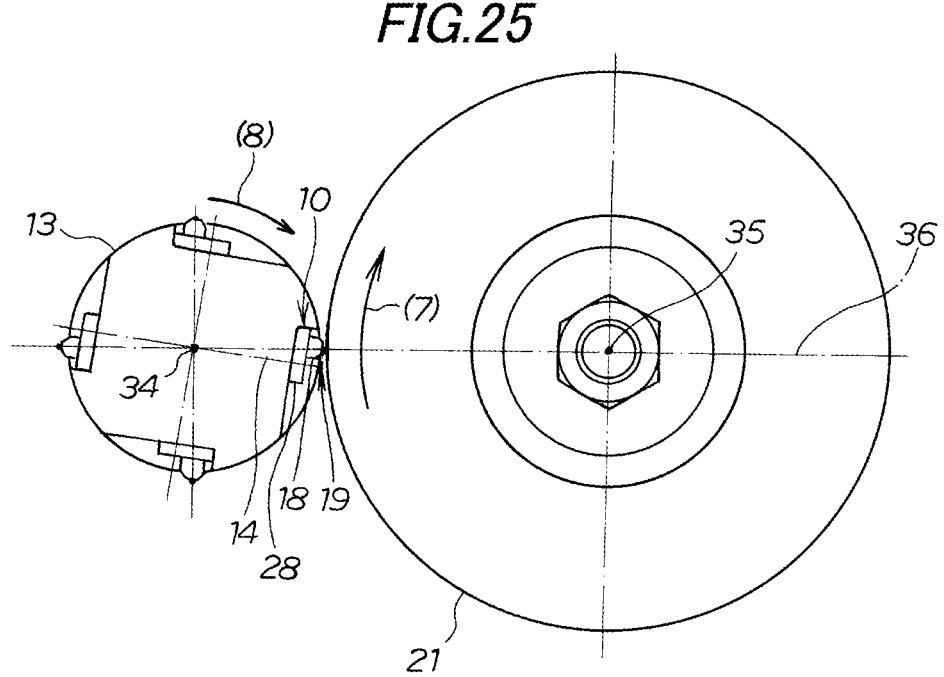
FIG. 25 is a front view of the grindstone.

As illustrated in FIG. 25, when the rotating tool 13 and the truing grindstone 21 are mutually rotated, the truing grindstone 21 comes in contact with the abrasive grain 19 of the grindstone 10, in the state in which the normal line 14 of the rotating tool 13 is inclined to a straight line 36 connecting the rotation center 34 of the rotating tool 13 and a rotation center 35 of the truing grindstone 21. The truing grindstone 21 is rotated in a direction of the arrow (7), and the rotating tool 13 is rotated in a direction of the arrow (8).

Next, a mechanism for forming the relief surface will be described with reference to an enlarged view.

Figure 26:
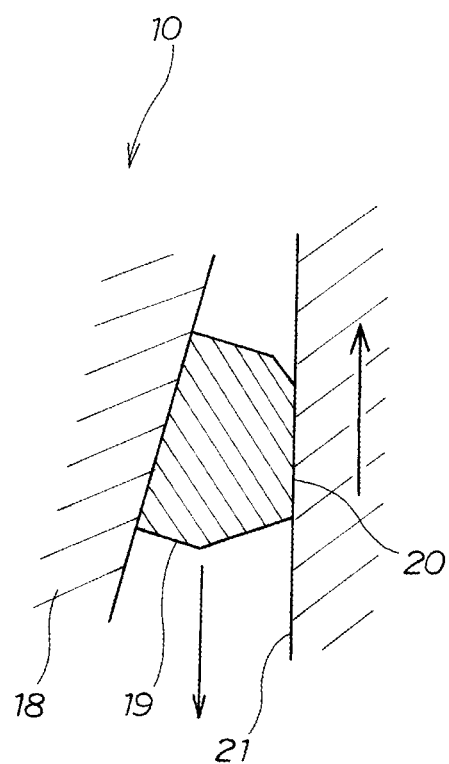
FIG. 26 is a diagram illustrating a process of bonding a relief surface.

FIG. 26 is an enlarged view of the contact portion of the abrasive grain 19 and the truing grindstone 21 in FIG. 25.

As illustrated in FIG. 25, since the abrasive grain 19 comes in contact with the truing grindstone 21 at an angle, and the diameter of the truing grindstone 21 is significantly large than the abrasive grain 19, the contact surface 20 is formed in a plane, and the smooth surface 20 (relief surface 20) inclined to the abrasive grain 19 is formed. As a result, it is possible to form the substantially same relief surface 20 of high precision on the abrasive grains 19 of the plurality of grindstones 10, which are disposed on the circumference of the rotating tool 13, at once.

Next, a process of replacing the grindstone at an original position of the grindstone will be described.

Figure 27A:
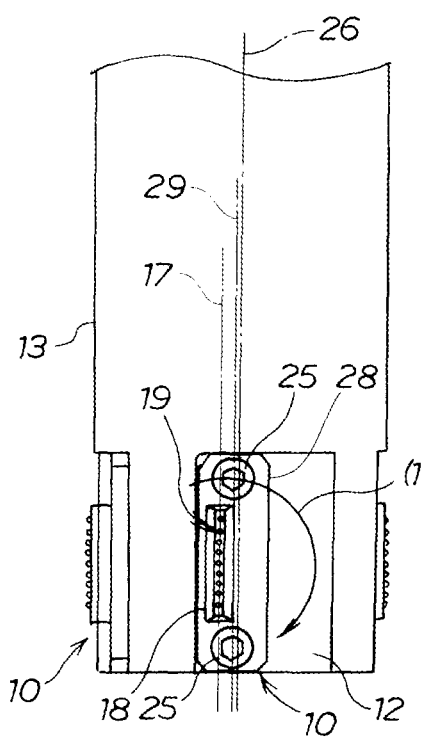
FIGS. 27(a) to 27(d) are diagrams illustrating a process of replacing the grindstone.

As illustrated in FIG. 27(a), the fixing member 25 is detached, and the grindstone 10 is inverted in the front and rear direction as an arrow (11). Before the fixing member 25 is detached, as illustrated in FIG. 27(b), the abrasive grain 19 is placed at the position which is offset by the distance L1 from the normal line 14 of the rotating tool 13.

Figure 27C:
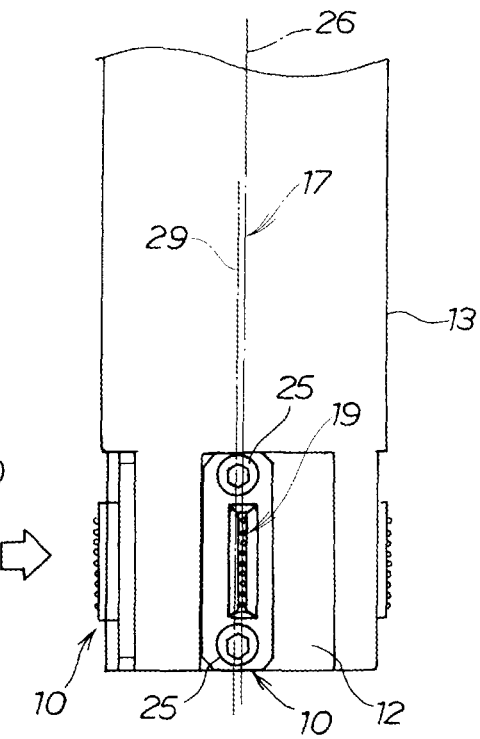

As illustrated in FIG. 27(c), the grindstone is fixed to the rotating tool 13 by the fixing member 25. In this instance, as illustrated in FIG. 27(d), the abrasive grain 19 is disposed on the normal line 14 of the rotating tool 13. In the case of grinding the workpiece, the rotating tool 13 is rotated in a direction of the arrow (12).

Figure 27B:
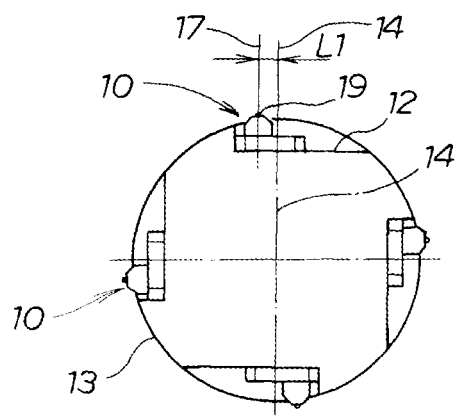
Figure 27D:
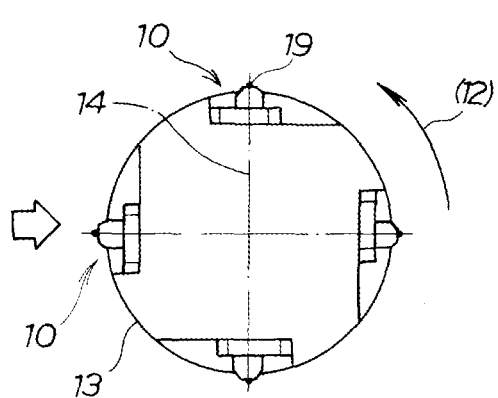
Figure 28:
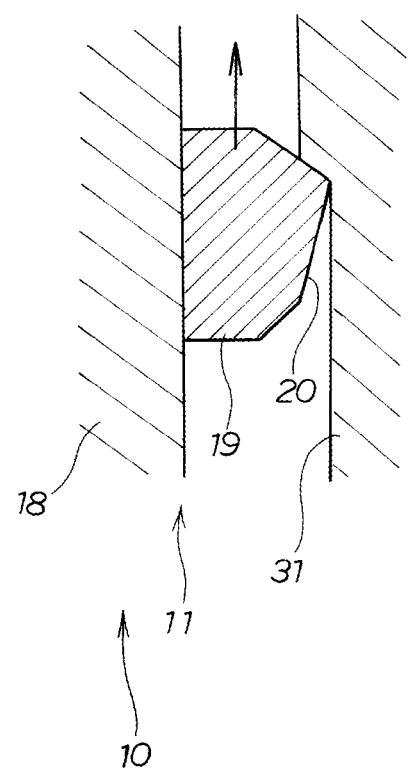
FIG. 28 is a diagram illustrating a grinding state.

As illustrated in FIG. 28, first, while the abrasive grain 19 is offset from the normal line 14 (FIG. 27(b)), it is possible to grind the abrasive grain 19 formed with the inclined smooth surface 20 (relief surface 20) by the truing of the mutual rotation, in the state in which it has the relief surface 20 of a predetermined relief angle to the workpiece 31 by inverting and placing the grindstone 10 on the normal line 14 through the replacement. In this way, the grinding resistance can be reduced.

Eighth Exemplary Embodiment

Next, an eighth exemplary embodiment will be described with reference to the drawings. The same reference numerals have been used to identify the same or similar elements as those of the configuration illustrated in FIGS. 27(a) to 27(d), and the description thereof will be omitted or in brief herein.

As illustrated in FIG. 29(a), the fixing hole 29 formed in the body portion 28 of the grindstone 10 is an elongated hole.

In the process of forming the relief surface, as illustrated in FIG. 29(b), the abrasive grain 19 is placed at the position which is offset from the normal line 14 of the rotating tool 13. By rotating the truing grindstone 21 in a direction of the arrow (14) and rotating the rotating tool 13 in a direction of the arrow (15), as illustrated in the enlarged view of FIG. 26, the relief surface 20 can be formed on the abrasive grain 19. Since the abrasive grain 19 comes in contact with the truing grindstone 21 at an angle, and the diameter of the truing grindstone 21 is significantly larger than the abrasive grain 19, the contact surface 20 is formed in a plane, and the smooth surface 20 (relief surface 20) inclined to the abrasive grain 19 is formed. As a result, it is possible to form the substantially same relief surface 20 of high precision on the abrasive grains 19 of the plurality of grindstones 10, which are disposed on the circumference of the rotating tool 13, at once.

In the process of replacing the grindstone to the original position of the grindstone, as the fixing member 25 illustrated in FIG. 29(a) is loosened, the grindstone 10 is moved in a direction of the arrow (16).

As illustrated in FIG. 29(b), a spacer 33 is disposed between the end portion 32 of the grindstone pocket 12 and the grindstone 10, and the grindstone 10 is fixed to the rotating tool 13 by the fixing member 25. As a result, the abrasive grain 19 formed with the inclined smooth surface 20 (relief surface 20) slides to dispose on the normal line 14, thereby grinding the workpiece in the state in which the abrasive grain has the relief surface 20 having the relief angle.

At grinding, as illustrated in FIG. 29(d), the rotating tool 13 is rotated in a direction of the arrow (17). In this instance, the grindstone 10 meets resistance in a direction opposite to the rotation direction of the rotating tool 13, but the position of the grindstone 10 is not deviated by the spacer 33.

The grindstone 10 according to the eighth exemplary embodiment will now be described in detail.

Figure 30A:
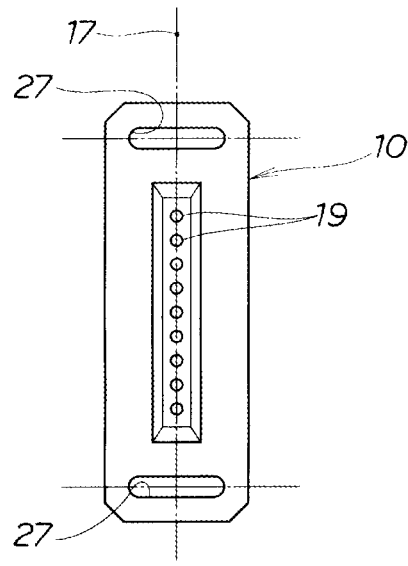
FIGS. 30(a) and 30(b) are plan views of the grindstone according to the eighth exemplary embodiment.

FIG. 30(a) is a diagram illustrating the case where the fixing hole 27 is an elongate hole 27. The fixing hole 27 is the elongate hole 27 perpendicular to the line 17 passing the center of the abrasive grains arranged in a row. The fixing member 25 (FIG. 29(a)) is loosened, and the grindstone 10 is slid to the rotating tool 13 (FIG. 29(a)), and then is fixed by the fixing member 25, so that the truing position and the grinding position of the workpiece can be mutually changed.

Next, other aspect of FIG. 30(a) will now be described.

Figure 30B:
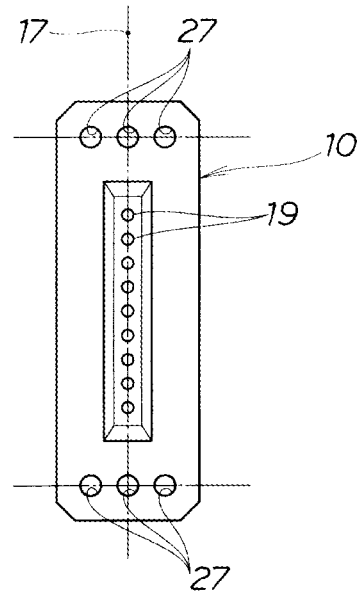

FIG. 30(b) is a diagram illustrating the case where the fixing hole 27 includes a plurality of hole sections 27. The fixing hole 27 includes the plurality of hole sections 27 arranged in series in a direction perpendicular to the line 17 passing the center of the abrasive grains arranged in a row. The fixing member 25 is detached, and the grindstone 10 is slid to the rotating tool 13 (FIG. 29(a)) to insert and penetrate other hole section 27 of the fixing member 25. As a result, the truing position and the grinding position of the workpiece can be mutually changed.

Ninth Exemplary Embodiment

Next, the ninth exemplary embodiment will be described with reference to the drawings. The same reference numerals have been used to identify the same or similar elements as those of the configuration illustrated in FIG. 30(a), and the description thereof will be omitted or in brief herein.

Figure 31A:
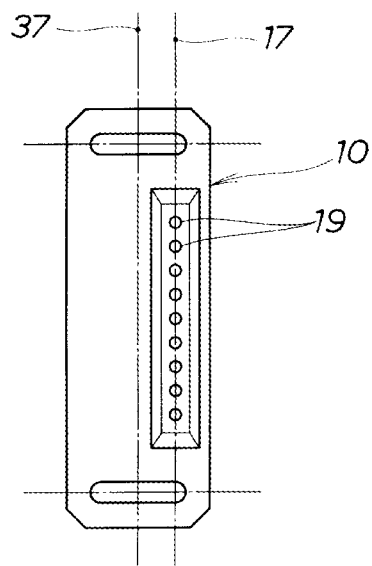
FIGS. 31(a) and 31(b) are plan views of the grindstone according to a ninth exemplary embodiment.

FIG. 31(a) is a diagram illustrating the case where the fixing hole 27 is an elongate hole 27. The fixing hole 27 is the elongate hole 27 perpendicular to the line 17 passing the center of the abrasive grains arranged in a row. The center 37 of the elongate hole 27 in the longitudinal direction is offset by a predetermined distance from the line 17 passing the center of the abrasive grains arranged in a row. The fixing member 25 (FIG. 29(a)) is loosened, and the grindstone 10 is slid to the rotating tool 13 (FIG. 29(a)), and then is fixed by the fixing member 25, so that the truing position and the grinding position of the workpiece can be mutually changed. In addition, the fixing member 25 is detached, and the grindstone 10 is inverted in the front and rear direction to the rotating tool 13, and then is fixed by the fixing member 25, so that the truing position and the grinding position of the workpiece can be mutually changed.

Next, other aspect of FIG. 31(a) will now be described.

Figure 31B:
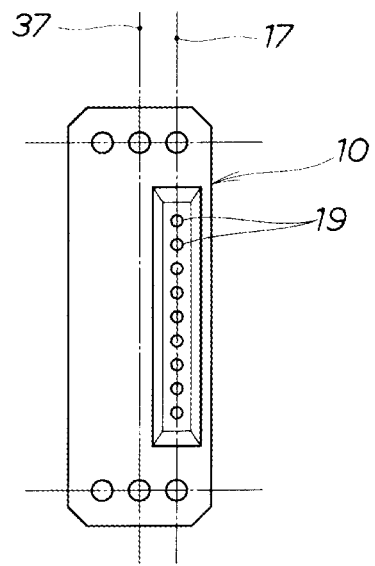
Figure 32A:
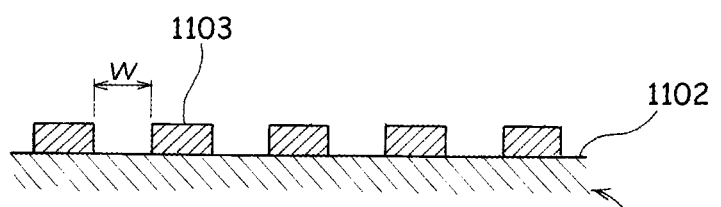
FIGS. 32(a) to 32(c) are diagrams illustrating a basic principle of the related art.
Figure 32B:
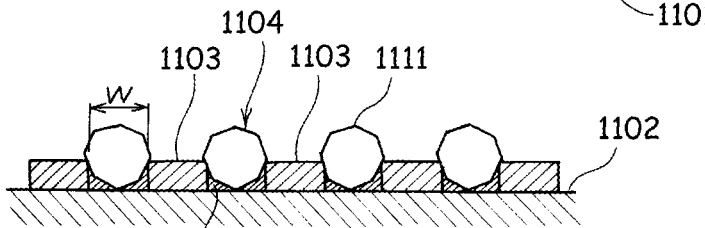
Figure 32C:
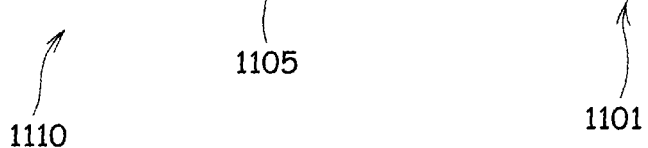
Figure 33A:
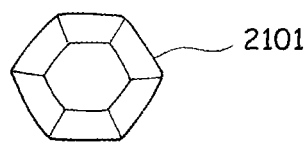
FIGS. 33(a) to 33(c) are diagrams illustrating a grindstone according to the related art.
Figure 33B:
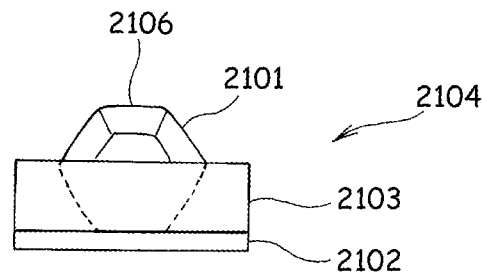
Figure 33C:
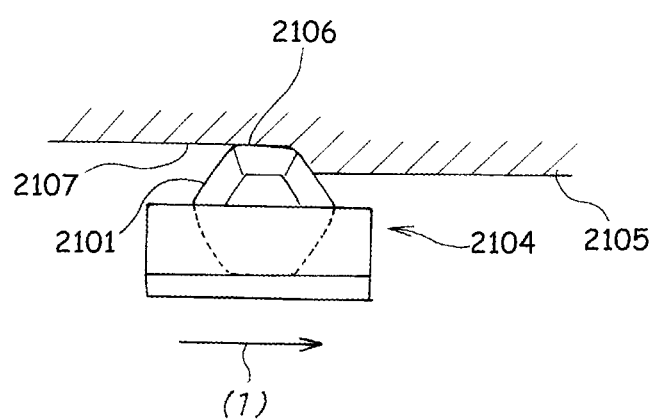
Figure 34:
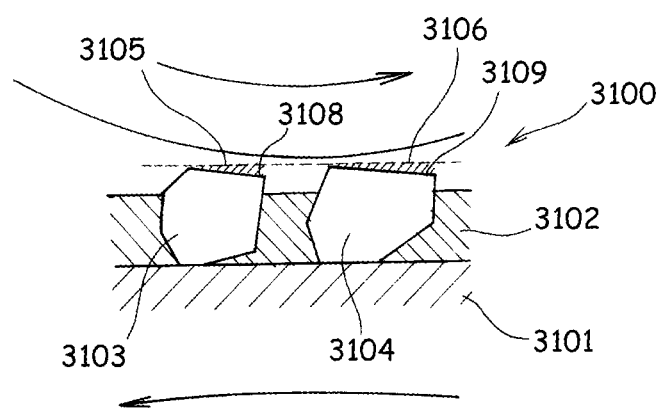
FIG. 34 are diagrams illustrating a basic configuration of the related art.
Figure 35:
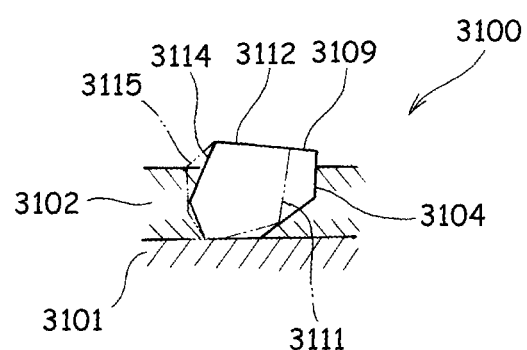
FIG. 35 is a diagram illustrating a problem of the related art.
Figure 36:
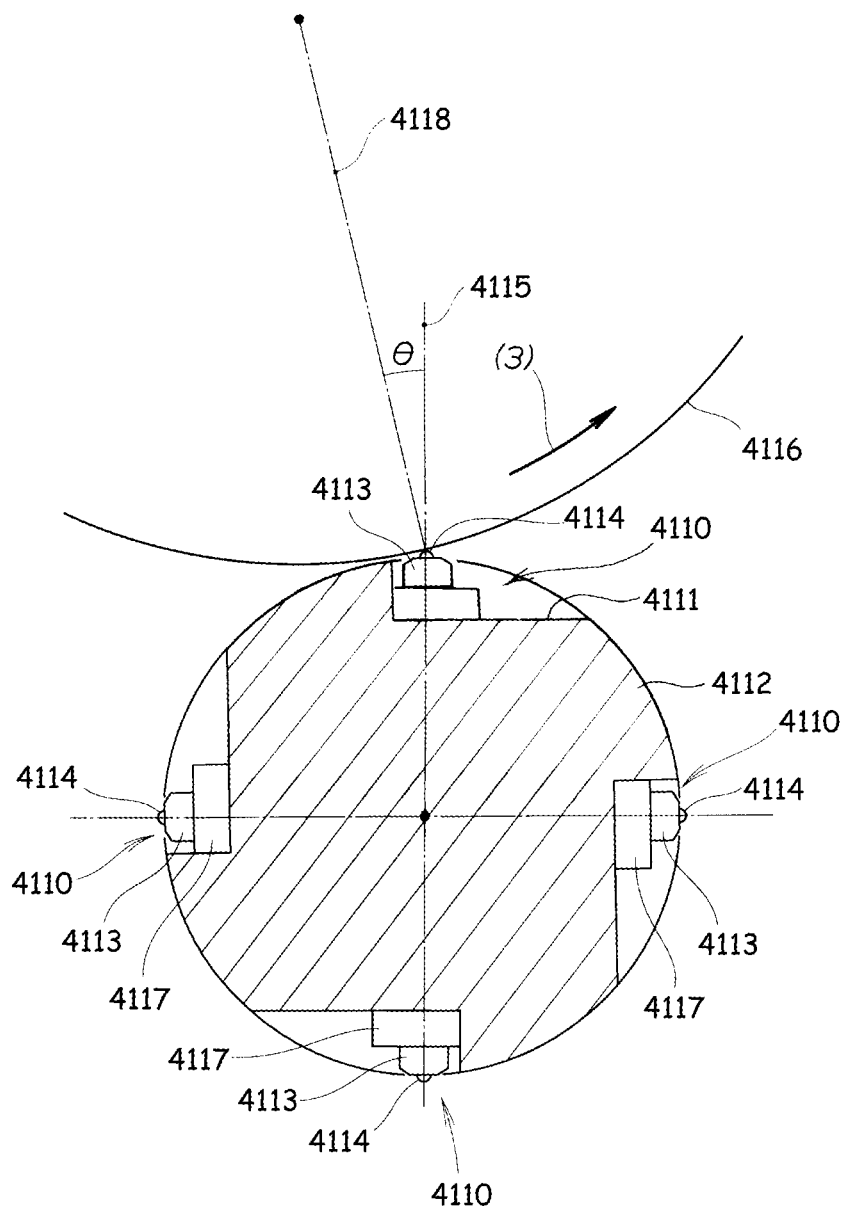
FIG. 36 is a diagram illustrating a relief surface machining method of the related art (which is not Prior Art).

FIG. 31(b) is a diagram illustrating the case where the fixing hole 27 comprises a plurality of hole sections 27. The fixing hole 27 includes the plurality of hole sections 27 arranged in series in a direction perpendicular to the line 17 passing the center of the abrasive grains arranged in a row. The center of the plurality of hole sections 27 in the arranged direction is offset by a predetermined distance from the line 38 passing the center of the abrasive grains arranged in a row. The fixing member 25 is detached, and the grindstone 10 is slid to the rotating tool 13 (FIG. 29(a)) to insert and penetrate other hole section 27 of the fixing member 25. As a result, the truing position and the grinding position of the workpiece can be mutually changed. In addition, the fixing member 25 is detached, and the grindstone 10 is inverted in the front and rear direction to the rotating tool 13, and then is fixed by the fixing member 25, so that the truing position and the grinding position of the workpiece can be mutually changed.

The contents of the seventh exemplary embodiment to the ninth exemplary embodiment will now be summarized and described below.

As illustrated in FIGS. 24, 29(a) and 29(c), in the grindstone 10 attached to at least one grindstone pocket 12 which is formed in the cylindrical rotating tool 13 provided on the rotational shaft, the grindstone 10 includes the abrasive grain bonding portion 18 extending along the axis 26 of the rotating shaft and bonded with the abrasive grain 19, the abrasive grains 19 bonded to the abrasive grain bonding portion 18 in the state in which the abrasive grains are arranged in one row in parallel with the axis 26 of the rotating shaft, the fixing member 25 fixing the grindstone 10 to the rotating tool 13, and the fixing hole 27 provided in the body portion 28 through which the fixing member 25 passes. The fixing hole 27 is formed so that the abrasive grain 19 can be changed from the position on the normal line 14 of the rotating tool 13 to the position which is offset from the normal line 14.

With the configuration, in the state in which the abrasive grain 19 is placed at the position which is offset from the normal line 14 of the rotating tool 13, the truing grindstone 21 and the rotating tool 13 are mutually rotated, and the abrasive grain is ground by the truing, so that the relief surface 20 having the relief angle of high precision can be easily formed on all the grindstone 10 (abrasive grain 19).

Also, in the truing of the related art, the abrasive grain 19 on the normal line is surface-attached in a flat in parallel with the plane vertically intersecting with the normal line 14. In this regard, in the present invention, the abrasive grain 19 surface-attached by the truing in the state in which it is offset from the normal line 14 of the rotating tool 13 is changed to its original position to be positioned on the normal line 14 of the rotating tool 13, so that the relief surface 20 is formed on the abrasive grain 19. That is, the positioning precision or the reproduction precision can be improved, and the plurality of abrasive grains 19 can be formed with the relief surface 20 having the uniform relief angle by the easy method.

In addition, the rotating tool 13 is fast rotated, so that the uniform relief surface 20 of high precision can be formed on the plurality of abrasive grains 19 all provided on the circumference of the rotating tool 13 for a short time.

As illustrated in FIG. 24, the fixing hole 27 is formed on the offset line 29 which is offset by a predetermined distance from the line passing the center of the abrasive grains arranged in one row.

With the configuration, only by detaching the grindstone 10 from the rotating tool 13 and inverting the grindstone in the front and rear direction, the abrasive grain 19 can be easily changed to the offset position from the normal line 14 of the rotating tool 19.

As illustrated in FIG. 30(a), the fixing hole 27 is the elongate hole perpendicular to the line 17 passing the center of the abrasive grains arranged in a row.

With the configuration, the fixing member 25 is loosened, and the grindstone 10 is slid, so that the abrasive grain 19 can be easily changed to the offset position from the normal line 14 of the rotating tool 13.

As illustrated in FIG. 30(a), the longitudinal center 37 of the elongate hole is offset by a predetermined distance from the line 17 passing the center of the abrasive grains arranged in a row.

With the configuration, by the method in which the grindstone 10 is detached from the rotating tool 13, and then is inverted in the front and rear direction, or the method in which the grindstone 10 is slid in the state in which the fixing member 25 is loosened, the abrasive grain 19 can be easily changed to the offset position from the normal line 14 of the rotating tool 13.

As illustrated in FIG. 31(b), the fixing hole 27 includes the plurality of hole sections 27 arranged in series in a direction perpendicular to the line 17 passing the center of the abrasive grains arranged in a row.

With the configuration, the grindstone 10 is detached from the rotating tool 13, and then the position is slid to insert and penetrate the fixing member 25, thereby fixing the grindstone 10. Therefore, the abrasive grain 19 can be easily changed to the offset position from the normal line 14 of the rotating tool 13.

As illustrated in FIG. 31(b), an arranged direction center 38 of the plurality of holes is offset by a predetermined distance from the line 17 passing the center of the abrasive grains arranged in a row.

With the configuration, by the method in which the grindstone 10 is detached from the rotating tool 13, and then is inverted in the front and rear direction, or the method in which the grindstone 10 is detached from the rotating tool 13, and then the position is slid so that the fixing member 25 is inserted and penetrated in other hole 27 to fix the grindstone 10, the abrasive grain 19 can be easily changed to the offset position from the normal line 14 of the rotating tool 13.

As illustrated in FIGS. 29(a) to 29(d), the method of forming the relief surface on the abrasive grain includes the process of preparing the grindstone 10, the process of moving the grindstone 10 to the position which is offset by the parallel movement from the original position of the grindstone when the grindstone 10 is provided for grinding, and fixing the grindstone to the rotating tool 13, the process of forming the relief surface 20 on the abrasive grain 19 by the truing grindstone 21, and the process of replacing the grindstone 10 to the original position of the grindstone.

With the configuration, the elongate hole 27 can be inverted or moved in parallel so that it is disposed on the normal line 14 of the rotating tool 13 or at the position which is offset from the normal line. In the state in which the abrasive grain 19 is offset from the normal line 14, the rotating tool 13 and the truing grindstone 21 are mutually rotated and are brought in contact with each other, and the uniformly inclined smooth surface (relief surface 20) is formed on all the abrasive grains 19. After that, the grindstone 20 is again attached so that the abrasive grain 19 is disposed on the normal line 14. The rotating tool 13 is fast rotated, so that the uniform relief surface 20 of high precision can be formed on the plurality of abrasive grains 19 all provided on the circumference of the rotating tool 13 for a short time.

Also, only by offsetting the grindstone 10 through the parallel movement from the original position of the grindstone when the grindstone 10 is provided for grinding, the truing can be easily performed.

As illustrated in FIG. 24, FIG. 27(a) and FIG. 27(c), the method of forming the relief surface on the abrasive grain includes the process of preparing the grindstone 10, the process of inverting the grindstone 10 in the front and rear direction to the position which is offset from the original position of the grindstone when the grindstone 10 is provided for grinding, and fixing the grindstone to the rotating tool 13, the process of forming the relief surface 20 on the abrasive grain 19 by the truing grindstone 21, and the process of replacing the grindstone 10 to the original position of the grindstone.

With the configuration, since special incidental equipments are not required, it is possible to reduce the cost of the equipment. Also, since the grindstone 10 is merely inverted, it is possible to reduce the number of steps for fixing the grindstone 10 to the rotating tool 13.

Meanwhile, in the seventh exemplary embodiment to the ninth exemplary embodiment, although the rotating tool 13 is provided with four rows of grindstones 10, the present invention is not limited thereto. The number of rows may be appropriately changed depending upon the workpiece or grinding condition, for example, 8 rows or the like.

DESCRIPTION OF REFERENCE NUMERALS

111 . . . abrasive grain, 112 . . . temporary stand, 113 . . . base, 114 . . . adhesive, 116 . . . upper surface (of temporary stand), 125 . . . plating layer, 130 . . . grindstone,
210 . . . abrasive grain, 211 . . . base, 212 . . . surface of base, 216 . . . relief surface, 220 . . . boring tool (line boring bar), 221 . . . shaft, 225 . . . rake surface, 228 . . . journal hole, 252 . . . arm, 267 . . . diameter enlarging mechanism, α . . . rake angle, β . . . relief angle,
310 . . . abrasive grain positioning jig, 319 . . . base, 321 . . . support member, 322 . . . abrasive grain, 323 . . . contact portion, 337 . . . upper surface (one surface), 342 . . . rake surface, 345 . . . plating layer, 346 . . . relief surface, 350 . . . grindstone,
10 . . . grindstone, 12 . . . grindstone pocket, 13 . . . rotating tool, 14 . . . normal line, 15 . . . bottom surface of grindstone pocket, 16 . . . lateral surface of grindstone pocket, 17 . . . line passing center of abrasive grains, 18 . . . base, 19 . . . abrasive grain, 20 . . . relief surface (flat surface), 21 . . . truing grindstone, 25 . . . fixing member, 26 . . . axis, 27 . . . fixing hole (elongate hole), 28 . . . body portion, 29 . . . offset line, 31 . . . work piece, 37 . . . center of elongate hole in longitudinal direction, 38 . . . center of plurality of holes in aligning direction

The invention claimed is:

1. A method of manufacturing a grindstone in which an abrasive grain, having a truncated octahedron shape, is arranged on one surface of a base, the method comprising:
    preparing the base, the abrasive grain, a temporary stand having a flat upper surface to which the abrasive grain is temporarily bonded, and an adhesive temporarily bonding the abrasive grain to the temporary stand;
    applying the adhesive to the upper surface of the temporary stand;
    temporarily bonding the abrasive grain to the upper surface of the temporary stand by the adhesive so that one of a plurality of surfaces of the abrasive grain adheres closely to the upper surface;
    inverting the temporary stand to direct the abrasive grain downward;
    facing the temporary stand to the base while the temporary stand is maintained at a predetermined angle;
    bonding the abrasive grain to the base by a plating layer; and
    detaching the temporary stand from the abrasive grain.

2. A grindstone in which a plurality of abrasive grains, having a truncated octahedron shape, are arranged in a row and bonded to a surface of a base,
    wherein each of the plurality of abrasive grains includes a relief surface having a relief angle of a predetermined angle, and
    wherein the relief surfaces of the plurality of abrasive grains are arranged on a same surface.

3. The grindstone according to claim 2, wherein the grindstone is a grindstone for boring.

4. A boring tool comprising:
a cylindrical shaft; and
a plurality of the grindstones according to claim 2 which are arranged in a line along an axial direction on the shaft.

5. A boring tool comprising:
a cylindrical tool holder;
an arm which is oscillatably provided in the cylindrical tool holder and is expandable in a circumferential direction by a diameter enlarging mechanism; and
the grindstone according to claim 2 which is provided on a front end of the arm.

6. A method of manufacturing a grindstone in which rake surfaces of a plurality of abrasive grains, having a truncated octahedron shape, are arranged on one surface of a base in a longitudinal direction of the base, the method comprising:
preparing the base and the plurality of abrasive grains;
arranging the abrasive grains on the one surface of the base so that rake surfaces of the plurality of abrasive grains follow the longitudinal direction by bringing rake surfaces of the plurality of abrasive grains into contact with a contact portion which is provided on a support member which supports the base so as to have a predetermined angle to an upper surface of the base which is equal to an angle formed by the rake surface of the abrasive grain to the upper surface of the base;
bonding the abrasive grains to the base by a plating layer in a state in which the rake surfaces are arranged on the same surface; and
forming relief surfaces on the abrasive grains.

7. An abrasive grain positioning jig capable of positioning a position of an abrasive grain, having a truncated octahedron shape to a base when the abrasive grain is bonded to one surface of the base via a plating layer, the abrasive grain positioning jig comprising:
a support member which supports the base which is inclined to a horizontal direction; and
a contact portion which extends from the support member to the one surface of the base, comes in contact with a rake surface of the abrasive grain which is arranged on the one surface of the base, and has a predetermined angle to the one surface of the base which is equal to an angle formed by the rake surface of the abrasive grain to the one surface of the base.

8. A grindstone which is attached to a grindstone pocket formed in a cylindrical rotating tool, the grindstone comprising:
an abrasive grain bonding portion which extends along an axis of the rotating tool and to which abrasive grains are bonded;
the abrasive grains aligned in a row in parallel with the axis and bonded to the abrasive grain bonding portion; and
a fixing hole through which a fixing member adapted to fix the abrasive grain bonding portion to the rotating tool passes,
wherein the fixing hole is configured so that the abrasive grains are changed from a position on a normal line of the rotating tool to a position which is offset from the normal line.

9. The grindstone according to claim 8, wherein the fixing hole is provided on an offset line which is offset by a predetermined distance from a line passing centers of the abrasive grains aligned in the row.

10. The grindstone according to claim 8, wherein the fixing hole is an elongate hole extending in a direction perpendicular to a line passing centers of the abrasive grains aligned in the row.

11. The grindstone according to claim 10, wherein a longitudinal center of the elongate hole is offset from the line passing the centers of the abrasive grains.

12. The grindstone according to claim 8, wherein the fixing hole comprises a plurality of hole sections aligned in series in a direction perpendicular to a line passing centers of the abrasive grains aligned in the row.

13. The grindstone according to claim 12, wherein a center of the plurality of hole sections in the direction that the hole sections are aligned is offset from the line passing the centers of the abrasive grains.

14. A method of forming a relief surface, the method comprising:
preparing a grindstone set forth in claim 8;
moving the grindstone to a position which is offset from an original position in which the grindstone is used for a grinding operation, by a parallel movement, and fixing the grindstone to a rotating tool (in the offset position;
forming a relief surface on an abrasive grain by a truing grindstone; and
replacing the grindstone to the original position of the grindstone.

15. A method of forming a relief surface, the comprising:
preparing a grindstone set forth in claim 8;
inverting the grindstone in a front and rear direction to a position which is offset from an original position in which the grindstone is used for a grinding operation, and fixing the grindstone to a rotating tool in the offset position;
forming a relief surface on an abrasive grain by a truing grindstone; and
replacing the grindstone to the original position of the grindstone.

\* \* \* \* \*